US007450914B2

(12) United States Patent
Valdivia et al.

(10) Patent No.: US 7,450,914 B2
(45) Date of Patent: Nov. 11, 2008

(54) METHOD AND APPARATUS FOR ALLOCATING DATA COMMUNICATIONS RESOURCES IN A SATELLITE COMMUNICATIONS NETWORK

(75) Inventors: Aaron Valdivia, Ellicott City, MD (US); Rajeev Gopal, N. Potomac, MD (US); Ishan Weerakoon, Baltimore, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 680 days.

(21) Appl. No.: 09/918,961

(22) Filed: Jul. 31, 2001

(65) Prior Publication Data

US 2003/0027522 A1 Feb. 6, 2003

(51) Int. Cl.
*H01Q 11/12* (2006.01)

(52) U.S. Cl. .................... 455/121; 455/427; 455/452.1; 455/450; 455/446

(58) Field of Classification Search ................ 455/450, 455/453, 427, 12.1, 13.4, 121, 452.1, 446
See application file for complete search history.

(56) References Cited

U.S. PATENT DOCUMENTS

| 4,256,925 A | * | 3/1981 | Goode ........................ 370/322 |
| 4,430,432 A | * | 2/1984 | Ando et al. ................. 435/199 |
| 4,800,561 A | * | 1/1989 | Ishi ............................ 370/324 |
| 5,561,841 A | * | 10/1996 | Markus ....................... 455/446 |
| 5,594,780 A | * | 1/1997 | Wiedeman et al. .......... 455/430 |
| 5,655,005 A | * | 8/1997 | Wiedeman et al. .......... 370/320 |
| 5,715,297 A | * | 2/1998 | Wiedeman .................. 455/427 |
| 5,903,837 A | * | 5/1999 | Wiedeman ................... 455/427 |
| 5,915,217 A | * | 6/1999 | Wiedeman et al. .......... 455/427 |
| 5,918,157 A | * | 6/1999 | Wiedeman et al. ......... 455/13.1 |
| 6,047,186 A | * | 4/2000 | Yu et al. ...................... 455/446 |
| 6,067,442 A | * | 5/2000 | Wiedeman et al. ......... 455/13.1 |
| 6,272,341 B1 | * | 8/2001 | Threadgill et al. .......... 455/428 |
| 6,336,035 B1 | * | 1/2002 | Somoza et al. ............. 455/446 |
| 6,366,761 B1 | * | 4/2002 | Montpetit .................. 455/12.1 |
| 6,377,561 B1 | * | 4/2002 | Black et al. ................. 370/330 |
| 6,463,279 B1 | * | 10/2002 | Sherman et al. ............. 455/427 |
| 6,628,921 B1 | * | 9/2003 | Vaddiparty et al. ......... 455/12.1 |
| 6,731,616 B1 | * | 5/2004 | Berrada et al. .............. 370/322 |
| 6,744,737 B1 | * | 6/2004 | Arkko ........................ 370/252 |
| 6,771,966 B1 | * | 8/2004 | Chow ......................... 455/446 |
| 6,904,265 B1 | * | 6/2005 | Valdivia et al. ............ 455/12.1 |
| 2001/0026537 A1 | * | 10/2001 | Massey ...................... 370/316 |
| 2002/0009060 A1 | * | 1/2002 | Gross ......................... 370/321 |
| 2002/0147011 A1 | * | 10/2002 | Kay .......................... 455/427 |
| 2004/0136334 A1 | * | 7/2004 | Heiman et al. .............. 370/316 |
| 2004/0203746 A1 | * | 10/2004 | Knauerhase et al. ..... 455/432.1 |
| 2005/0197134 A1 | * | 9/2005 | McKenna et al. ........ 455/452.1 |

* cited by examiner

*Primary Examiner*—Quynh H Nguyen
(74) *Attorney, Agent, or Firm*—Bell, Boyd & Lloyd LLP

(57) ABSTRACT

A method and system are provided for allocating satellite resources in a satellite communication system. A network interface is provided for making requests for satellite resources. A request processor determines whether the requests can be fulfilled based on a plurality of system constraints. The constraints can include, for example, the number of antennas on board the satellite, the number of active demodulators available on board the satellite, the configuration of a switch matrix which connects antennas to demodulators, and interference between signals transmitted to and from neighboring geographic cells. The network interface is preferably implemented in a web browser connected to a network which includes the Internet.

23 Claims, 20 Drawing Sheets

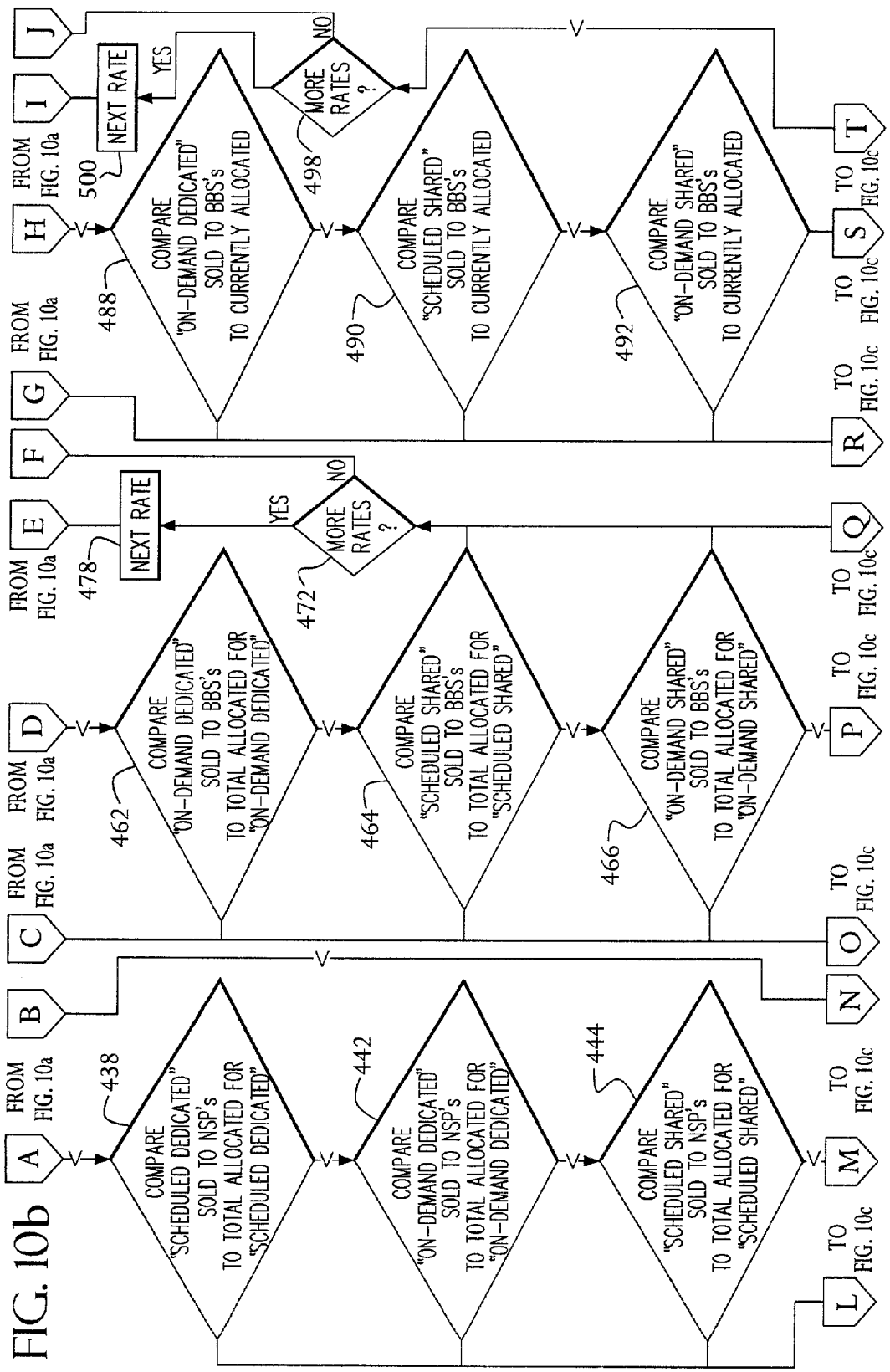

UNIFORM DISTRIBUTION

POPULATION DISTRIBUTION

METHOD AND APPARATUS FOR ALLOCATING DATA COMMUNICATIONS RESOURCES IN A SATELLITE COMMUNICATIONS NETWORK

FIELD OF THE INVENTION

The present invention relates to a system and method for allocating data communications resources in a satellite telecommunications network. More particularly, the present invention relates to a method and system for managing satellite capacity in a satellite telecommunications network using multiple uplink and downlink spot beams, and frequency reuse, to improve capacity management in the network. Even more particularly, the present invention relates to a web browser interface for receiving requests for data communications resources in a satellite telecommunications network, for determining whether the requests can be fulfilled given a plurality of system constraints, and for delivering feedback indicating whether the requests can be fulfilled.

BACKGROUND OF THE INVENTION

As time goes on, society continues to need more and more capacity for information exchange. Satellite telecommunications plays an increasing role in fulfilling that need. To fulfill society's need for satellite telecommunications capacity, companies launch sophisticated satellites and sell satellite capacity to other companies or entities. The traditional model for selling satellite capacity involved extended negotiations, contract drafting, the exchange of paper documents, and agreements weeks or even months in advance of actual transponder use by the customer.

With most existing telecommunications satellites, network engineers require a significant lead time in order to configure the network, the satellite and the transponders to service various customers' needs. With the limited flexibility of the traditional telecommunications satellite network, the sales model which included extended negotiations, contract drafting and significant lead time was adequate. However, as telecommunications satellites are growing more sophisticated, a need has arisen for an equally more sophisticated means of managing satellite capacity.

An example of a sophisticated satellite telecommunications system is a packet switched network, offering increased capacity by utilizing frequency reuse via a plurality of geographically distinct uplink and downlink cells. Individual cells can be accessible by antennas on the satellite which projects one or more spot beams. The spot beams allow satellite capacity to be increased because frequencies can be reused in geographically distinct areas. Capacity can be further increased by having a switching network incorporated into the satellite so that demodulators can be assigned to different uplink antennas so that more demodulators are available where more capacity is needed. A sophisticated payload control computer can also be used on board the satellite to allow continuous updating of the demodulator-to-antenna assignments. Thus, end-users can essentially increase or decrease their capacity requirements in real time, in varying geographic areas, and utilize only the capacity that is needed at any given moment. This allows the satellite capacity to be partitioned very efficiently, and in real time.

The traditional method of negotiating written contracts for use of transponder time is too cumbersome to take advantage of the increased flexibility of the types of satellite systems described above. Accordingly, a need exists for a more sophisticated approach to managing satellite capacity. That is, a system and method are needed which will accommodate customers' varying needs over time while taking into consideration the system's physical restraints such as the number of demodulators, the number of antennas, and the available switches on board the satellite, as well as taking into consideration other factors, such as minimizing interference between adjacent cells.

Such a system should provide a simple interface to network engineers, wholesalers and broadband services (BBS) end-users alike, while performing the highly complicated functions of satisfying the maximum number of capacity requests, while minimizing inter-cell and inter-frequency interference, and at the same time taking into consideration all known hardware and physical constrains on the system.

SUMMARY OF THE INVENTION

It is therefore an object of the present invention to provide a system and method for provisioning satellite resources which overcomes the above deficiencies.

It is also an object of the present invention to provide a system and method for efficiently allocating satellite resources to accommodate varying levels of demand in different geographic regions, as well as levels of demand which continuously change over time.

It is yet another object of the present invention to provide a simple interface to a satellite communications system, which will allow users to make requests for satellite resources. Based on such requests, the system according to an embodiment of the present invention can calculate whether such requests can be filled based on existing and future system constraints, and if such requests can be filled, the system according to an embodiment of the present invention can transmit commands to the satellite payload in order to reconfigure the satellite to accommodate the requests.

These and other objects of the present invention are substantially achieved by providing a system and method for provisioning satellite resources. Specifically, a system according to an embodiment to the present invention comprises a satellite, a network interface adapted to receive requests for satellite resources, a satellite resource allocation plan having information about the configuration of the satellite over time, and a request processor for determining whether the resources are available to fill said requests. The request processor is also adapted to send commands to the satellite payload processor in order to reconfigure the satellite over time to fulfill the requests for resources, and to update the satellite resource allocation plan based on requests which can be fulfilled.

The network interface is preferably implemented in a web browser connected to a network that includes the Internet. The satellite preferably has a plurality of antennas, with each of the antennas being adapted to receive transmissions from geographically distinct cells. The satellite also has a plurality of demodulators, with each of the demodulators being adapted to demodulate transmissions in a particular range of frequencies. The satellite also has a switch matrix for associating the demodulators with antennas, and further has a payload processor for configuring the switch matrix. The request processor is adapted to determine which geographic cell is associated with each of the requests. The request processor further determines whether there is an available frequency band within said cell to fulfill the request and also whether a demodulator is available to demodulate the available frequency. Finally the request processor determines whether the switch matrix is capable of connecting the antenna associated with the cell to the available demodulator. The system according to an embodiment of the present invention is further capable of determining based on existing satellite resource assignments a frequency allocation for each of the requests which will minimize interference within the requesting cell and neighboring cells. The system also transmits information representing the status of satellite resource allocations to the network interface to be available to the user.

BRIEF DESCRIPTION OF THE DRAWINGS

These and other objects, advantages and novel features of the invention will be more readily appreciated from the following detailed description and in conjunction with the accompanying drawings in which:

FIGS. 10a, 10b, 10c and 10d are flowcharts illustrating an example of a method of allocating uplinks according to an embodiment of the present invention;

Throughout the drawing figures, the same references numerals will be understood to refer to the same parts and components.

DETAILED DESCRIPTION OF THE INVENTION

Figure 1:
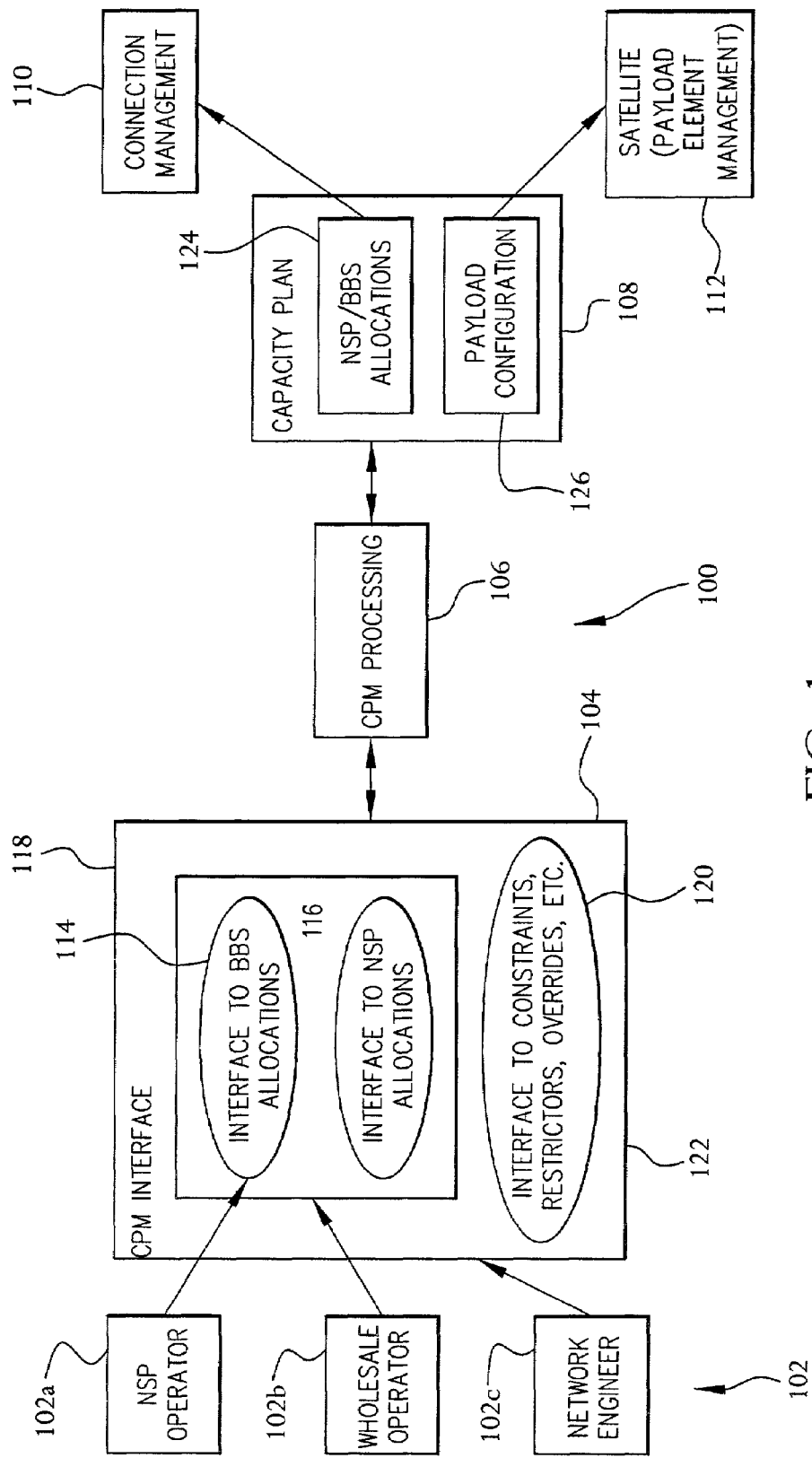
FIG. 1 illustrates a conceptual block diagram of a system according to an embodiment of the present invention.

A satellite communications system 100 employing an embodiment of the present invention is shown in FIG. 1. The system 100 includes a plurality of operators 102. The operators 102 can be of varying authorization levels. For instance, as shown in FIG. 1, there are shown a network service provider (NSP) operator 102a, a wholesale operator 102b, and a network engineer 102c. Each of the operators 102 have access to the capacity management interface 104. The capacity management interface 104 communicates with a capacity management processor 106. The capacity management processor 106 generates a capacity plan 108 and the capacity plan 108 is provided to a connection management subsystem 110 as well as the satellite 112. The satellite 112 includes a plurality of antennas for receiving signals from geographically distinct cells, a plurality of demodulators for demodulating signals within certain frequency ranges, as well as a payload control processor for managing a switch matrix. The switch matrix is able to connect any of the plurality of antennas with any of the plurality of demodulators.

As further shown in FIG. 1, each of the types of operators have different access to the capacity management interface 104. For instance, the NSP operator 102a only has access to BBS allocations, shown generally at 114. This is because the NSP operator is only authorized to change allocations of satellite resources to that particular NSP's BBS customers. The NSP operator will not be able reconfigure satellite resources for other NSPs. The wholesaler 102b, on the other hand, is authorized to manage satellite resources at the NSP level. Therefore the wholesale operator 102b has access to the interface to NSP allocations 116.

The wholesale operator also has access to the interface to BBS allocations 114, this combined set of interfaces is shown generally at 118. The network engineer 102c has even broader access. The network engineer 102c has access to an interface to constraints, restrictions, overrides, etc., 120, as well as the interfaces to NSP allocations 116 and BBS allocations 114. The combination of interfaces available to the network engineer 102c is shown generally at 122.

According to a preferred embodiment of the present invention, each of the operators 102 can remotely access the capacity management interface 104 via a web browser, communicating over the Internet (not shown). Each operator 102 will be able to log on, and based on the user's authorization level, an appropriate interface will be displayed on the user's web browser. So, for instance, the NSP operator 102a would be presented with information on the satellite resources allocated to that NSP's BBS customers. NSP operator 102a would also be presented with options for requesting for additional satellite resources or to reallocate resources from one BBS customer to another.

The network engineer 102c would have access to all of the information to which an NSP operator would have access. However, the network engineer 102c would additionally be presented with the information on current system constraints, restrictions, overrides, etc. As understood by those of skill in the art, the number of levels of operators authorized to use the capacity management interface 104 could be more than that shown in FIG. 1. For instance, access could be given to a BBS operator. The BBS operator would be presented with an interface showing satellite resource allocated to that particular BBS, as well as options for requesting new resources, or the reallocation of resources for that BBS only.

The capacity management interface 104 presents an interface, such as a graphical user interface, to the various authorized operators 102. The capacity management interface 104 also receives information, such as requests for satellite resource allocations, from the various authorized operators 102 and transmits the requests to the capacity management processor 106. The capacity management processor 106 evaluates the requests based on the current configuration of the satellite payload, as well as existing and future capacity plans.

The capacity management processor 106 will have access to the capacity plan 108, which includes information on NSP/BBS allocations 124 as well as current and futures satellite payload configurations 126. Using the known system constraints, the capacity management processor 106 evaluates each request for satellite resources, and determines whether the requests can be fulfilled. If the requests can be fulfilled, the capacity plan is updated to reflect the fulfilled requests, and commands are transmitted to the satellite payload so that the satellite 112 can be appropriately configured over time to fulfill the satellite capacity plan. If the capacity management processor 106 determines that the request cannot be fulfilled, a message is generated and transmitted to the capacity management interface 104 to be presented to the operator 102.

The capacity management processor 106 can include any number of algorithms to calculate the most efficient way to allocate satellite resources based on existing constraints. For instance, the capacity management processor 106 can calculate the capacity plan which will minimize interference based on the geographic distribution of uplink and downlink cells. The capacity management processor 106 can be updated over time to include new algorithms to take into consideration additional system constraints which may be known or discovered in the future.

Figure 2:
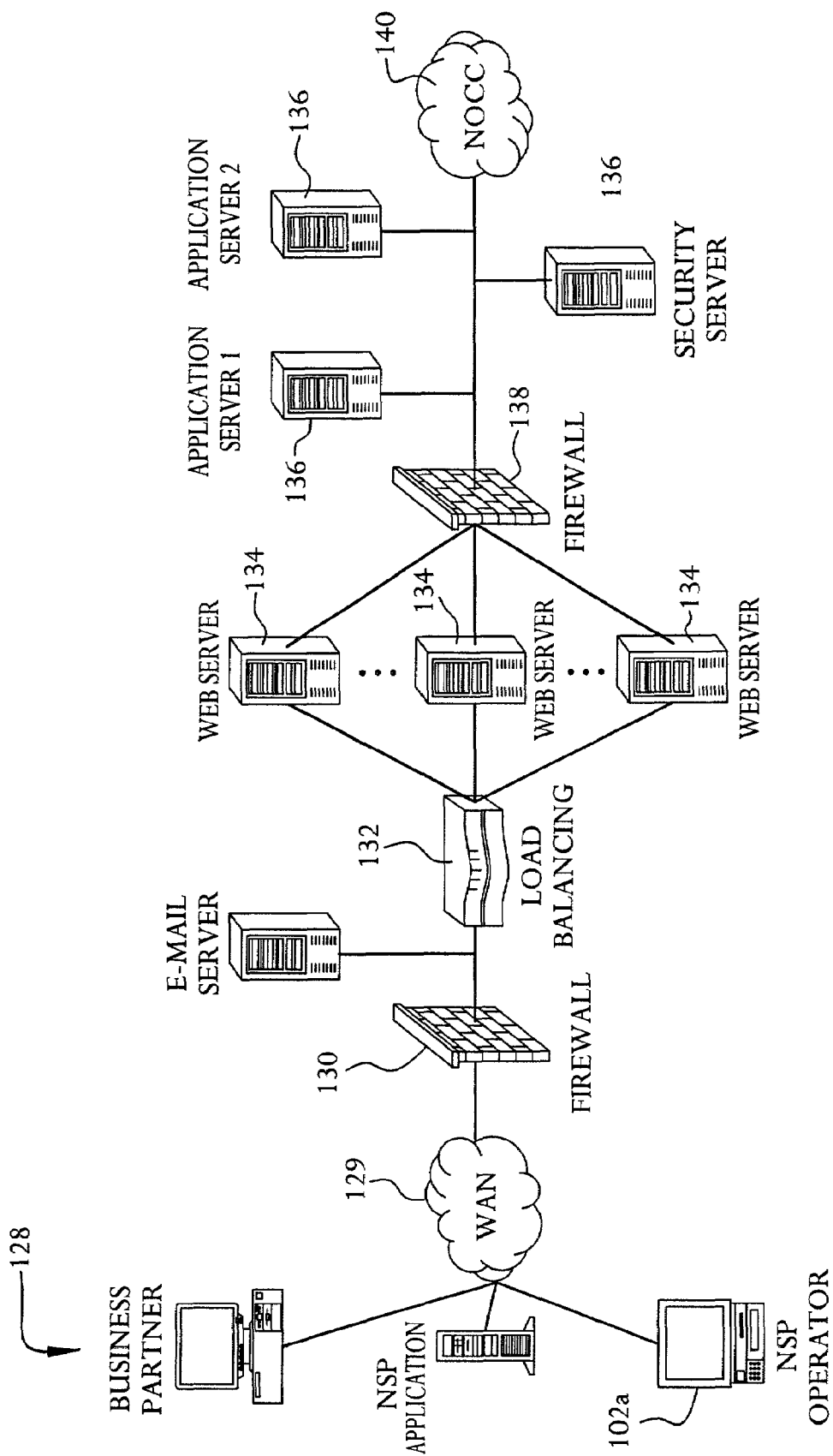
FIG. 2. illustrates a conceptual block diagram of an example of a system for requesting satellite resources over the Internet according to an embodiment of the present invention.

FIG. 2 illustrates one possible hardware configuration for a preferred embodiment of the NSP interface 104. In an embodiment of the present invention, the NSP interface 104 is one of a plurality of subsystems residing at a Network Operations Control Center (NOCC), shown generally at 127. The NSP interface 104 according to an embodiment of the invention is implemented using web servers, application servers and other equipment physically located within the NOCC 127. Those of skill in the art will appreciate that the NSP interface could also be implemented with servers and other equipment located in different physical locations. Various users 128 of the NOCC 127 connect to the NOCC 127 through a network, such as the Internet, shown generally at 129. The users 128 of the NOCC 127, can include operators, such NSP operators 102a, described above in connection with FIG. 1.

According to an embodiment of the invention, the NOCC 127 includes a first fire wall 130. Authorized communications are received by a load balancing device 132 and farmed out to one of the plurality of web servers 134. Communications are processed by the web servers 134 and requests are passed on to an appropriate application server 136 through a second fire wall 138.

The application servers 136 perform application specific functions. For instance, one of the application servers 136 is a certificate server. The certificate server will receive authorization information, for instance, to determine whether a particular user is authorized to use the system. Other application servers could perform other functions, such as retrieving the current capacity plan 108. Information requests can be passed from the application server 136 to the other components of the network operations control center 140 when appropriate.

According to an embodiment of the invention, a telecommunications satellite has a plurality of demodulators and a plurality of antennas. The satellite further has a switch matrix for connecting antennas to demodulators. The satellite operates preferably in the Ka band with a bandwidth of 500 MHz, preferably from 29.5 GHz to 30.0 GHz. The 500 MHz bandwidth is preferably divided into eight subbands which are each 62.5 MHz. Each demodulator demodulates a particular subband, and there are a plurality of demodulators for each subband. Furthermore, each antenna produces a spot bean for receiving uplink transmissions from a particular geographic cell, as described more fully below in connection with FIGS. 11a through 12b. The satellite also has a switch matrix for connecting particular antennas to particular subbands. Thus, subbands can be assigned to particular geographic cells by configuring the switch matrix so that the antenna associated with a certain geographic cell is connected to a demodulator which demodulated the subband associated with the cell.

According to an embodiment of the present invention, there are rules which determine how specific numbers of subbands are assigned to cells. As an example, it is preferable to assign at least one subband to every geographic cell. Also, more than one subband can be assigned to a particular cell, but no more than one instance of a particular subband may be assigned to the same cell. Furthermore, a system according to an embodiment of the present invention will have rules or constraints for the assignment of subbands to cells designed to minimize interference between cells. As will be described in greater detail below in connection with FIGS. 7 and 8, a system according to an embodiment of the present invention will have algorithms for assigning subbands to cells, for configuring the switch matrix, and for otherwise configuring the system to produce a capacity plan.

In a satellite system according to an embodiment of the present invention, subbands may be subdivided into channels. The channels can have different capacities and be of different bandwidths. Preferably the channel types include 16 Mbps carriers which are 20.83 MHz in width, 2 Mbps carriers which are 2.604 MHz in width, and 512 kbps or 128 kbps carriers which are each 651 kHz in width. Accordingly, there can be up to three 16 Mbps carriers in one subband, up to 24 2 Mbps carriers in one subband, and up to 96 512 kbps or 128 kbps carriers in one subband. As will be appreciated by one of skill in the art, channel types may be mixed within a subband, as described in greater detail below in connection with FIG. 14. A satellite system according to an embodiment of the present invention will have algorithms for assigning channels within a subband, which will be described in greater detail below in connection with FIG. 6. The algorithms will take into account any rules or constraints related to the assignment of channels within a subband.

Figure 3:
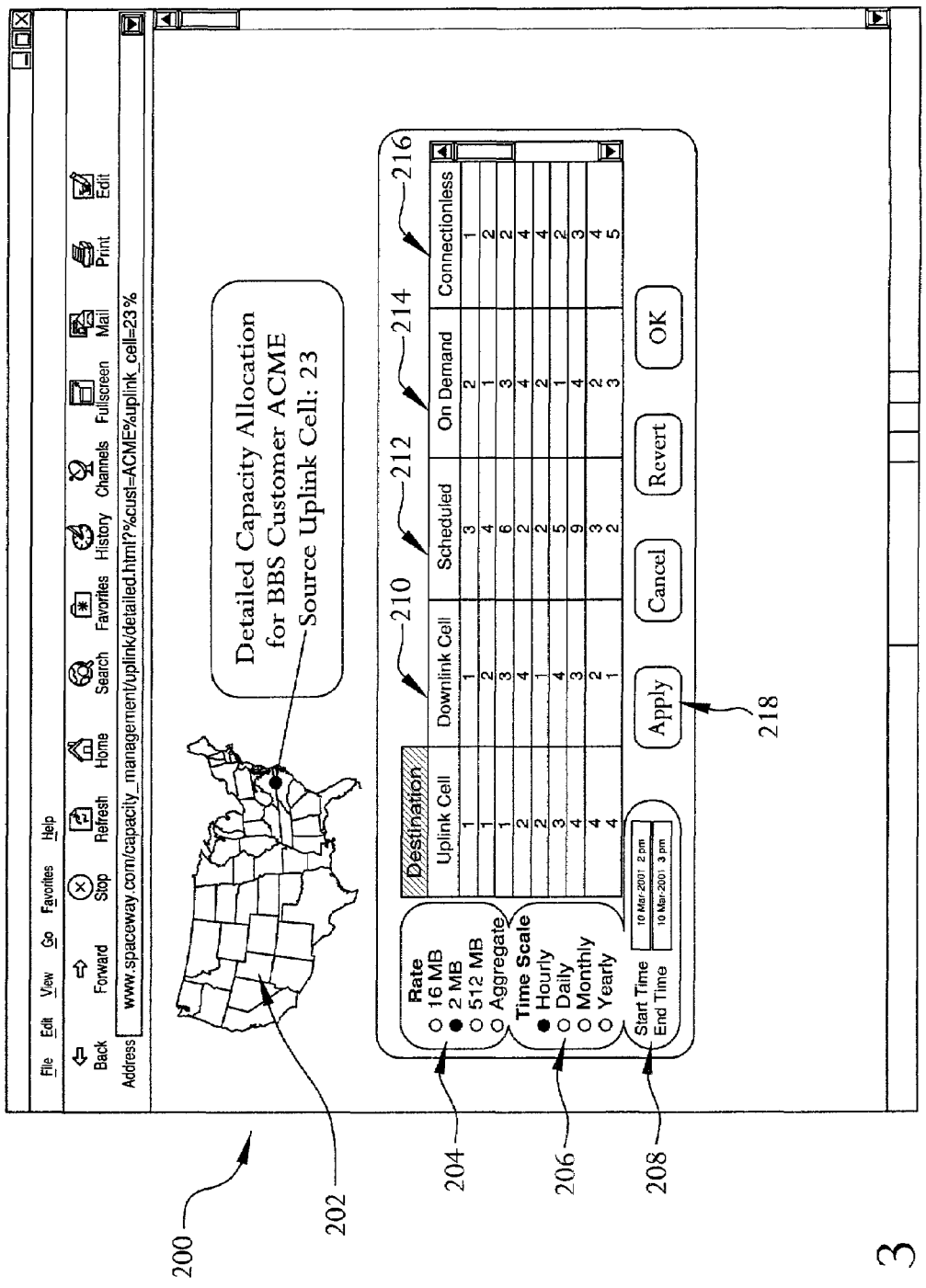
FIGS. 3-5 illustrate an example of a user interface available for requesting satellite resources according to an embodiment of the present invention.
Figure 4:
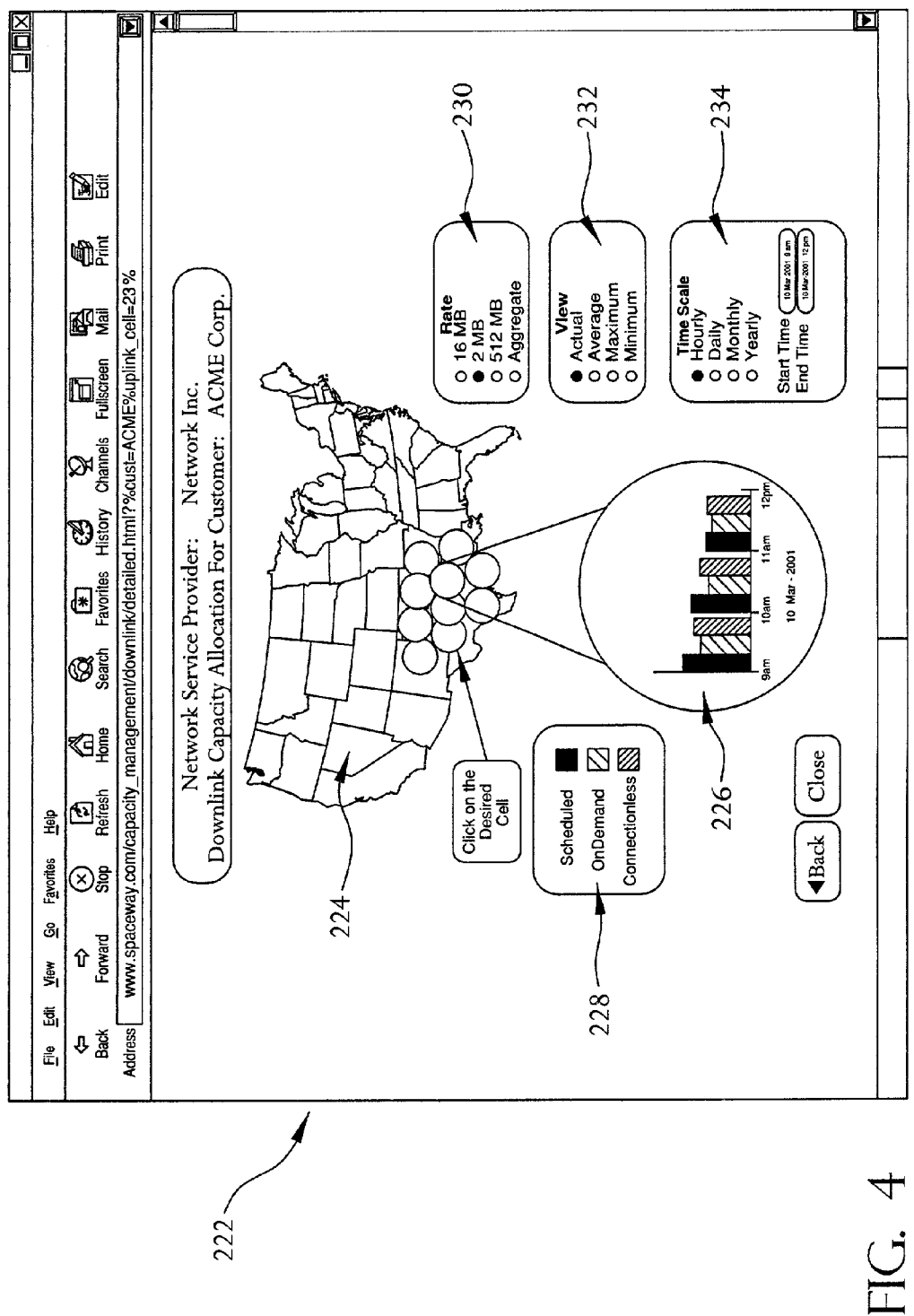
Figure 5:
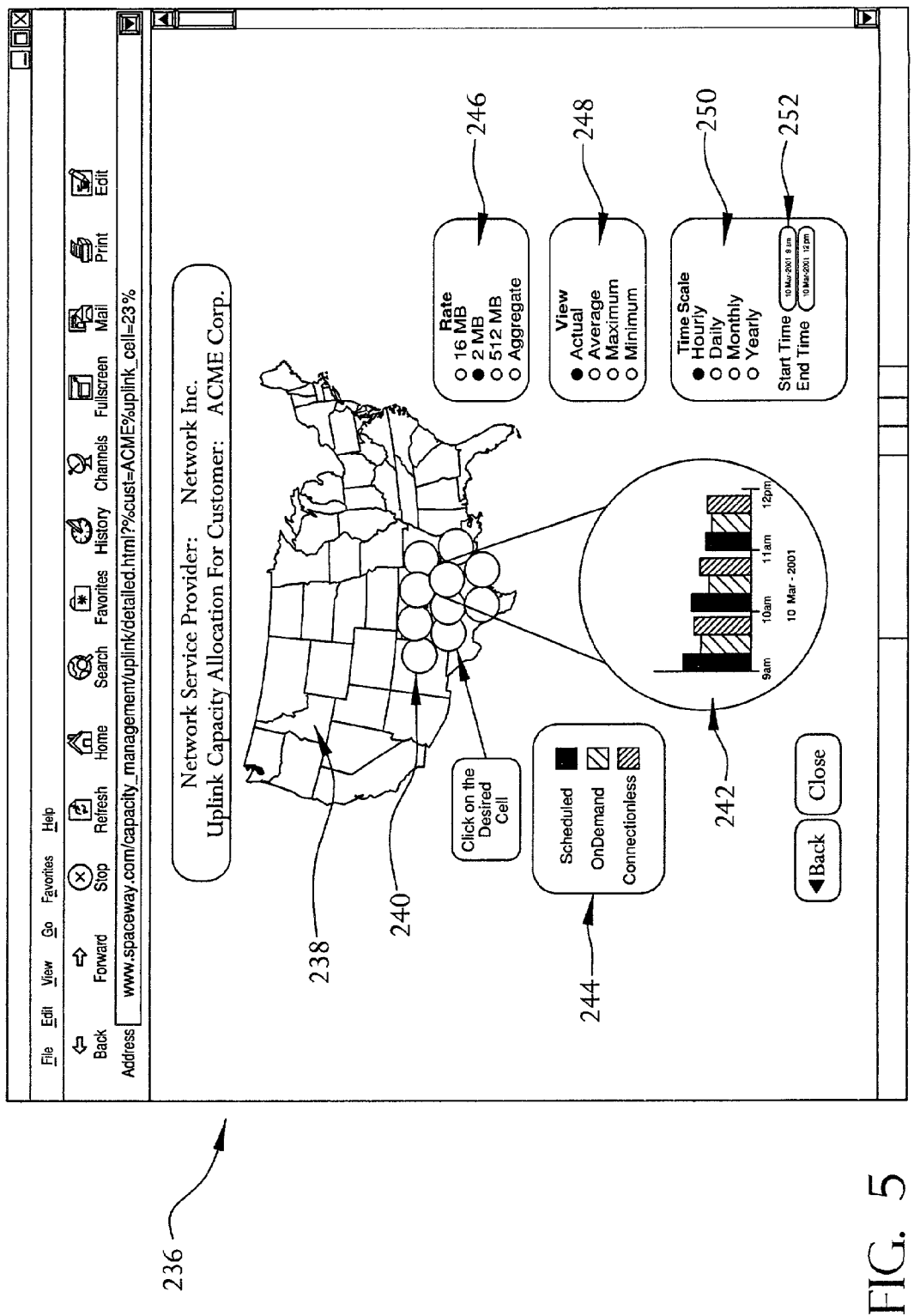

FIGS. 3-5 show examples of capacity management interfaces according to an embodiment of the present invention. FIG. 3 shows a web interface available via an internet browser 200. The web interface illustrates uplink allocations query and updates for a specific BBS customers belonging to an NSP. An NSP operator can click on a specific uplink cell to display a list of detailed uplink allocations for the BBS customer in that uplink cell. A map 202 of the coverage area is provided and information on specific uplink cells can be viewed by an authorized user with an internet connection. As shown, for example in FIGS. 3, details of the capacity allocation for a particular BS customer in a particular uplink cell is shown. An area with an interface is provided for selecting the particular rate 204 to be viewed. Also, the user has the option of selecting the time scale 206 as well start and end times 208. A list of the uplink cells and downlink cells allocated to a particular BBS customer is provided 210. The list 210 is further broken down by the type of connection, such as scheduled 212, or on demand 214, or connectionless 216. The user, if authorized, has the option of altering the allocations and causing the system to apply the changes made by simply clicking on the apply button 218. Also, in case any mistakes were made, a revert option is provided to revert back to the previous allocation plan.

FIG. 4 illustrates a web interface 222 used by network service providers to query downlink allocations for a BBS customers belonging to an NSP. An NSP operator can click on a specific downlink cell to display a list of detailed downlink allocations for the BBS customer belonging to the NSP. The interface includes a map of cells within the coverage area 224 the NSP user is enabled to click on the desired cell to see details of capacity allocations within a particular cell. The interface further includes a detailed view 226 of the scheduled, on-demand, and connection less allocations within the selected cell. This detail is broken down on an hourly basis and the key 228 to the allocation types is provided. Furthermore, the user can select the data rate 230. Further, the user can select a view which depicts actual allocations, average allocations, maximum allocations, or minimum allocations 232. The user is also able to select the time scale as well as start an end time 234. If hourly granularity is selected then the view shows actual allocations. For daily, monthly, and yearly granularity the user can select average, maximum, or minimum view. This view is derived from the actual hourly allocations contained in the selected time scale.

FIG. 5 illustrates how an NSP operator can query uplink allocations for a specific BBS customer in a cell. A web interface 236 is provided. The web interface includes a coverage map 238 showing the uplink cells 240 relevant to the particular NSP. As with the downlink cells, the user is able to click on a particular uplink cell and see a detail broken down on an hourly basis 242 of the allocation types. A color-coded key 244 is provided to distinguish the various allocation types. The user is able to select the data rate 246. The user can further select the view to show actual uplink allocations, average uplink allocations, maximum uplink or minimum uplink allocations 248. The user can further select 250 the time scale of the detailed view as well as the start and end times 252.

Figure 6:
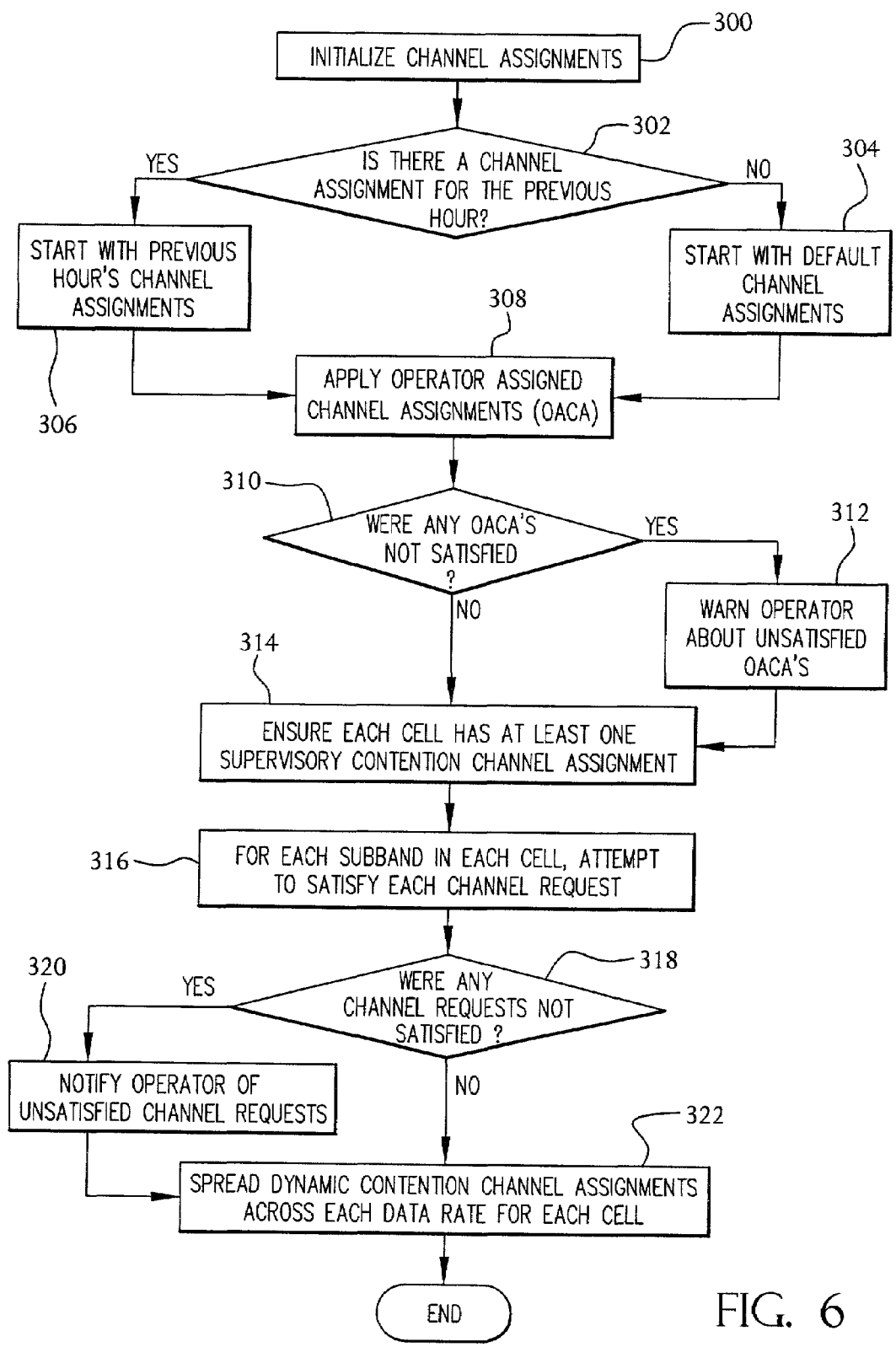
FIG. 6 is a flowchart illustrating an example of a method of assigning channels according to an embodiment of the present invention.

An example of a channel assignment algorithm which can be performed by the capacity management processor 106 is illustrated in the flowchart of FIG. 6. At step 300 the channel assignments are initialized. At step 302 the processor determines if there is a channel assignment for the previous hour. If there is no previous channel assignment a default channel assignment is used at step 304. If there is a previous channel assignment, the previous hour channel assignment is used at step 306. Operator assigned channel assignments are applied at step 308, and at step 310 the processor determines if any operator-assigned channel assignments were not satisfied. If any operator-assigned channel assignments were not satisfied, the processor generates a warning message to be transmitted to the operator at step 312. The processor ensures that each cell has at least one supervisory contention channel assignment at step 314. For each subband in each cell, processor attempts to satisfy each channel request at step 316. At step 318 the processor determines if any channel requests were not satisfied. If any channel requests were not satisfied, the processor generates a notification message to be transmitted to the operator which identifies the unsatisfied channel requests at step 320. At step 322 the processor spreads dynamic contention channel assignments across each data rate for each cell.

Figure 7:
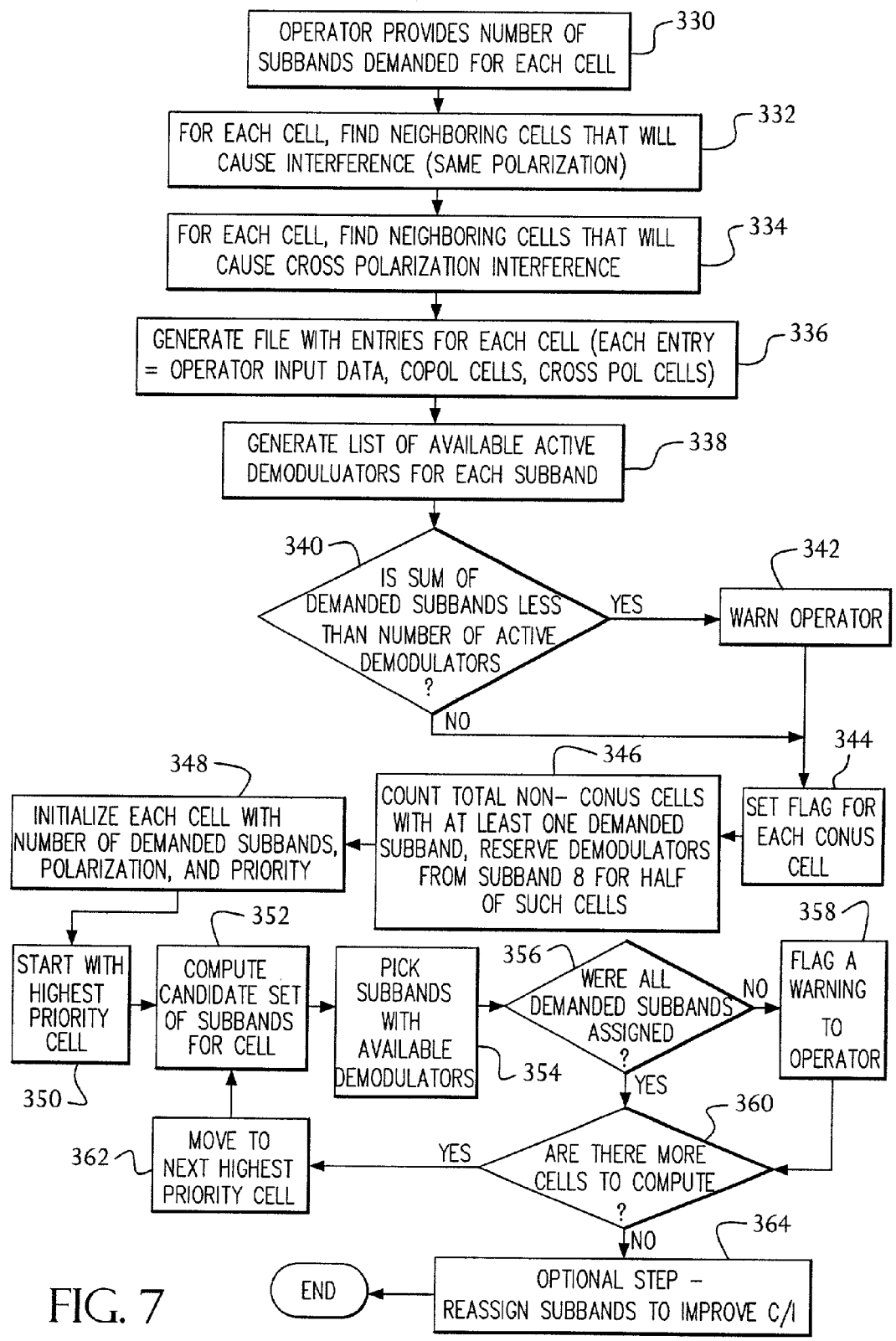
FIG. 7 is a flowchart illustrating an example of a method of mapping cells to subbands according to an embodiment of the present invention.

An exemplary algorithm for mapping cells to subbands is illustrated in the flowchart of FIG. 7. First, the number of subbands demanded for each cell is provided by the operator at step 330. For each cell, the processor determines a set of neighboring cells which could potentially cause interference in the same polarization at step 332. For each cell, the processor also determines a set of neighboring cells that could cause cross-polarization interference at step 324. The processor then generates a file with entries for each cell at step 336. Each entry includes information such as operator input data, co-polarization cells, and cross-polarization cells. The processor generates a list of available active demodulators for each subband. The processor then determines if there are enough active demodulators to meet the demand for subbands at step 340. If there are not enough active demodulators, a warning message is generated and transmitted to the operator at step 342. A flag is set for each CONUS cell at step 344. The processor counts the total number of non-CONUS cells with at least one demanded subband, and reserves demodulators from subband 8 for half of such cells at step 346.

Next, each cell is initialized with the number of demanded subbands, the cell's polarization, and the cell's priority at step 348. The processor begins with the highest priority cell at step 350, and computes a candidate set of subbands for the cell at step 352. Next, the processor determines which subbands have available demodulators at step 354. At 356 the processor determines if all demanded subbands were assigned. If there are not enough demodulators to accommodate the number of demanded subbands, a warning message is generated and transmitted to the operator at step 358. At 360 the processor determines if there are more cells for which to allocate subbands. If there are more cells, the processor moves to the next highest priority cell at step 362 and repeats steps 352-358 for each cell. Once all of the cells have been processed, the processor proceeds to an optional step 364 of reassigning subbands in order to reduce co-polarization and cross-polarization interference.

Figure 8:
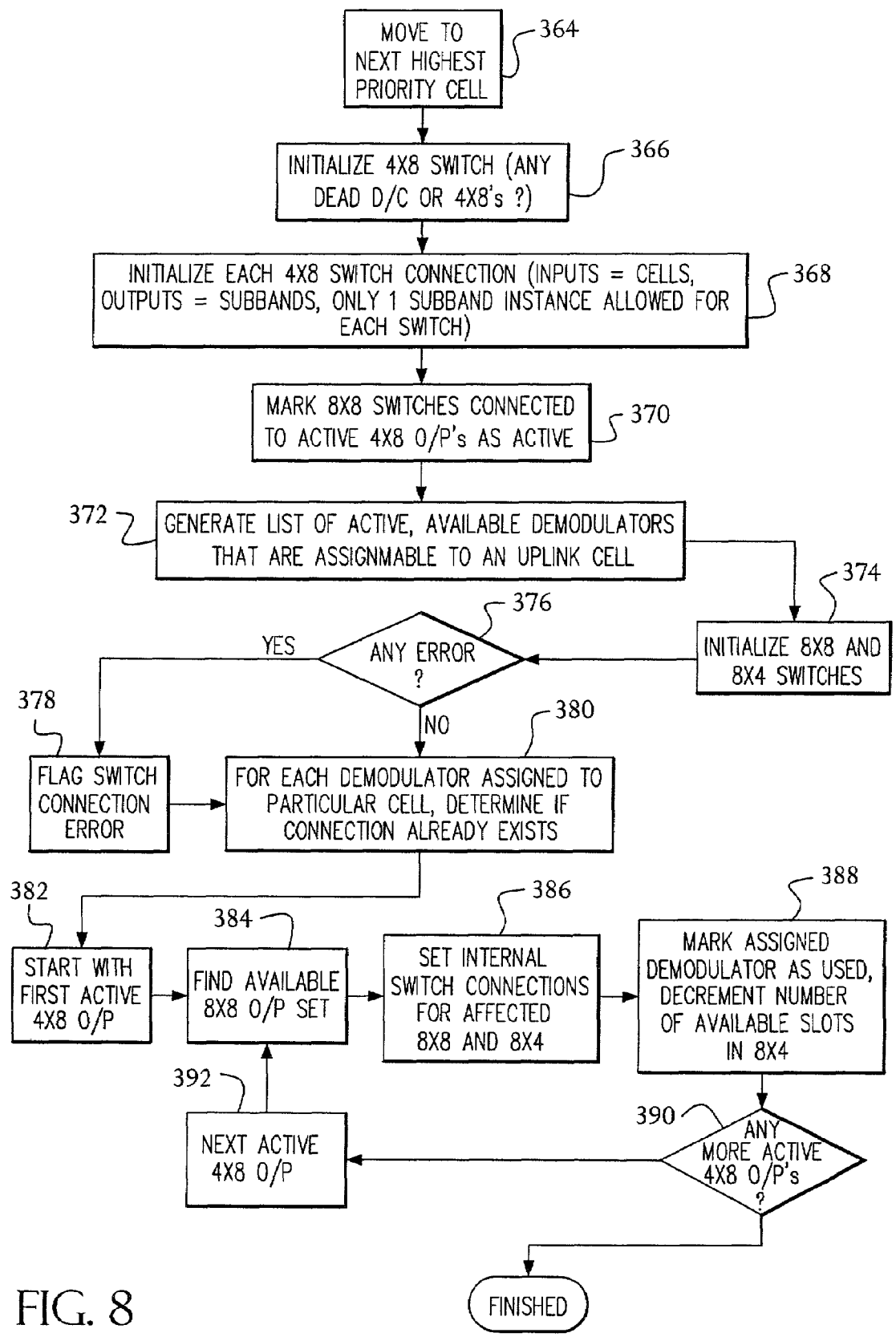
FIG. 8 is a flowchart illustrating an example of a method of allocating demodulators according to an embodiment of the present invention.

FIG. 8 illustrates an example of an algorithm for allocating demodulators according to a preferred embodiment of the present invention. In order to allocate demodulators, the processor retrieves a list of subbands needed for each uplink cell at step 364. On board the satellite, there is preferably a matrix of switches which are used to connect a plurality of antennas and down-converters to a plurality of demodulators. Each of the antennas receives communication signals from a particular geographic cell. Each of the demodulators demodulates a particular subband of the frequency range utilized by the satellite.

In a preferred embodiment, the switch matrix comprises 64 4×8 switches, 64 8×8 switches, and 64 8×4 switches. The plurality of antennas on board of the satellite are connected to the inputs of the 4×8 switches. The outputs of the 4×8 switches are connected to the input of the 8×8 switches. The outputs of the 8×8 switches are connected to the inputs of the 8×4 switches. Finally, the outputs of the 8×4 switches are connected to the plurality of demodulators. As would be understood by those of skill in the art, the combination of switches described herein is merely exemplary, and is considered the preferred configuration at the time of the invention. Many different combinations of switches on board of the satellite could be utilized without departing from the spirit of the invention, and, in fact, and embodiment of the present invention does not necessarily have to include a switch matrix at all.

At step 366 the set of 4×8 switches are initialized to determine if there are any dead down-converters or 4×8 switches. The inputs of the 4×8 switches are connected to the plurality of antennas, thus each 4×8 switch corresponds to a geographic cell. Each 4×8 switch has 8 outputs, and each output corresponds to one of the 8 subbands. Thus, each 4×8 switch and hence each individual antenna is connected to one instance of each of the 8 subbands. At step 368 each of the 4×8 switches are initialized to form a connection between the antenna inputs, and the associated subband outputs.

Thus, for instance, if a particular cell requires subbands 2 and 6, respectively, the 4×8 switch wired to the antenna aimed at the cell would be configured to make its outputs numbered 2 and 6 active. The outputs of the 4×8 switch for the cell would then lead to appropriate 8×8 and 8×4 switches, to connect to demodulators capable of demodulating subbands 2 and 6, respectively.

At step 370 the 8×8 switches which are connected to the active 4×8 switch outputs are marked as active. At step 372 the processor generates a list of available active demodulators that are assignable to an uplink cell. At step 374 the set of 8×8 and 8×4 switches are initialized and at step 376 the processor tests for any errors. If there were errors, they are flagged at step 378 and an error message is generated and transmitted to the operator.

Next, at step 380, for each demodulator assigned to a particular cell, the processor determines if the connection already exists. At step 382, the processor starts with the first active 4×8 output. At step 384, the processor finds an available 8×8 switch output set to connect the appropriate antenna with the appropriate demodulator. At step 386, the internal switch connections for affected 8×8 and 8×4 switches are set. The assigned demodulator is marked as "used", and the number of available slots in the 8×4 switch is decremented at step 388.

At step 390 the processor checks whether there are any more active 4×8 outputs to assign to demodulators. If there are more active 4×8 outputs, the next active 4×8 output is processed at step 392. The processor repeats steps 384 through 392 for each of the active 4×8 outputs. Once the processor determines that there are no more active 4×8 outputs at step 390, the demodulator allocation is completed.

Figure 9A:
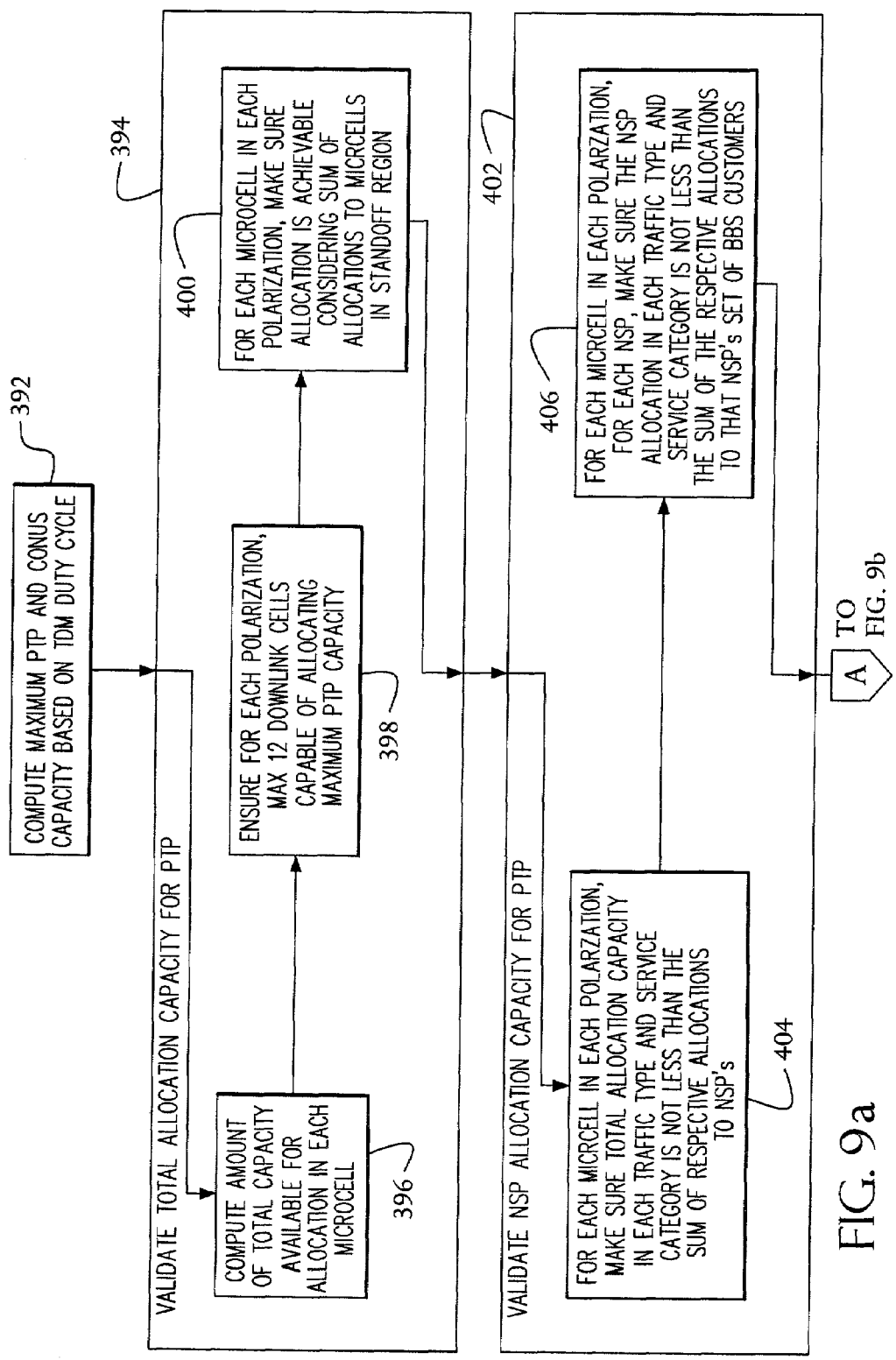
FIGS. 9a and 9b are a flowchart illustrating an example of a method of allocating downlinks according to an embodiment of the present invention.
Figure 9B:
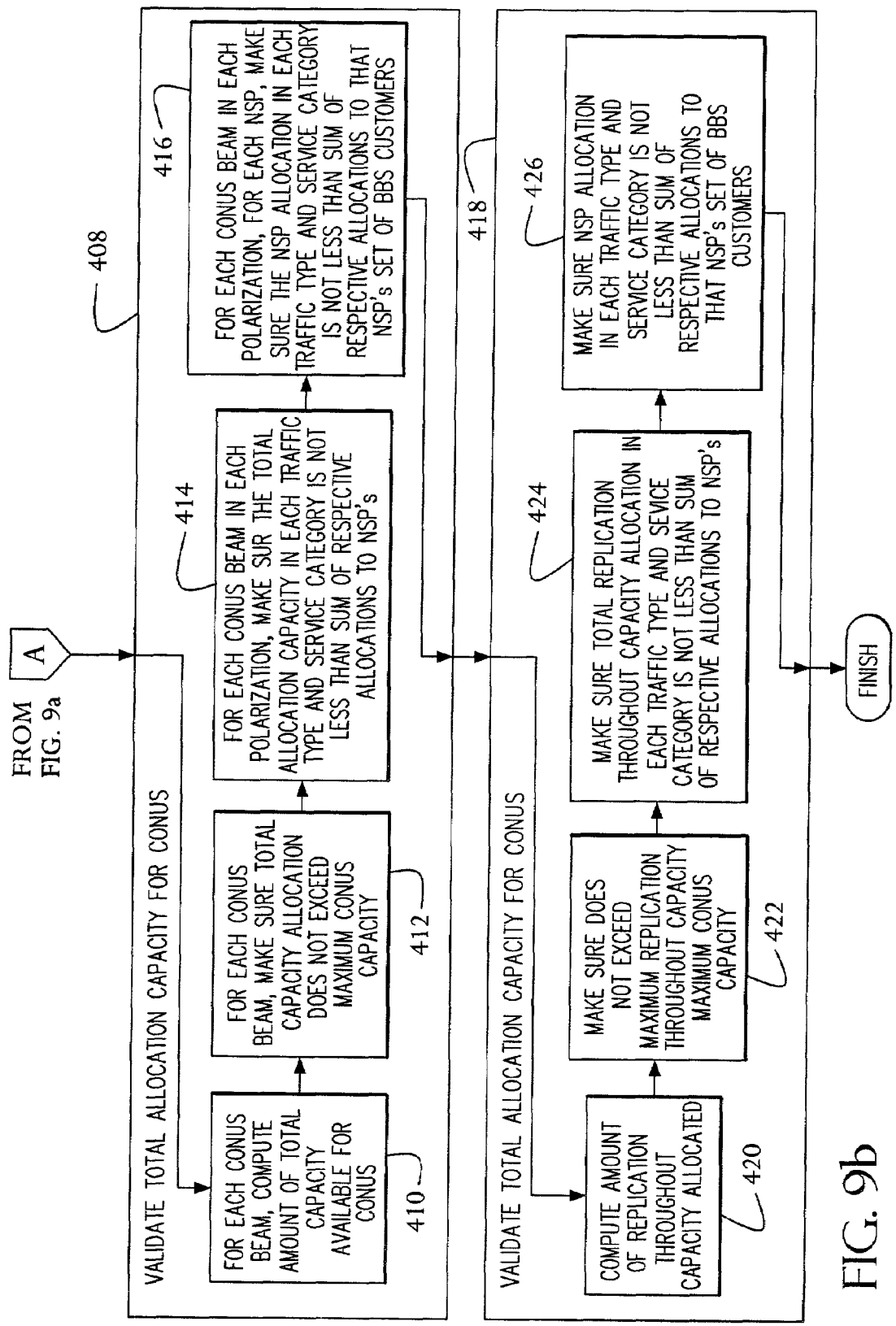
Figure 10A:
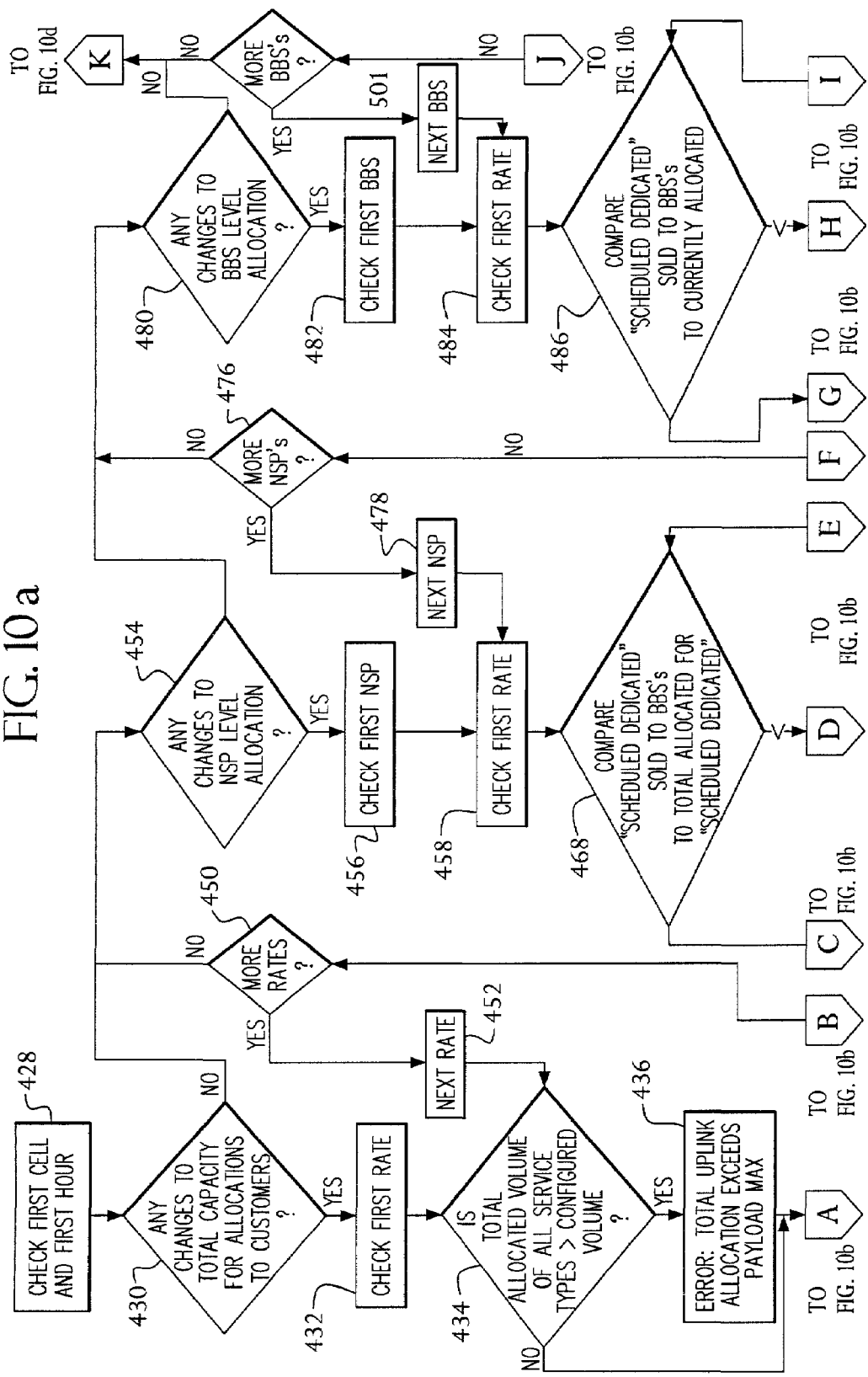
Figure 10C:
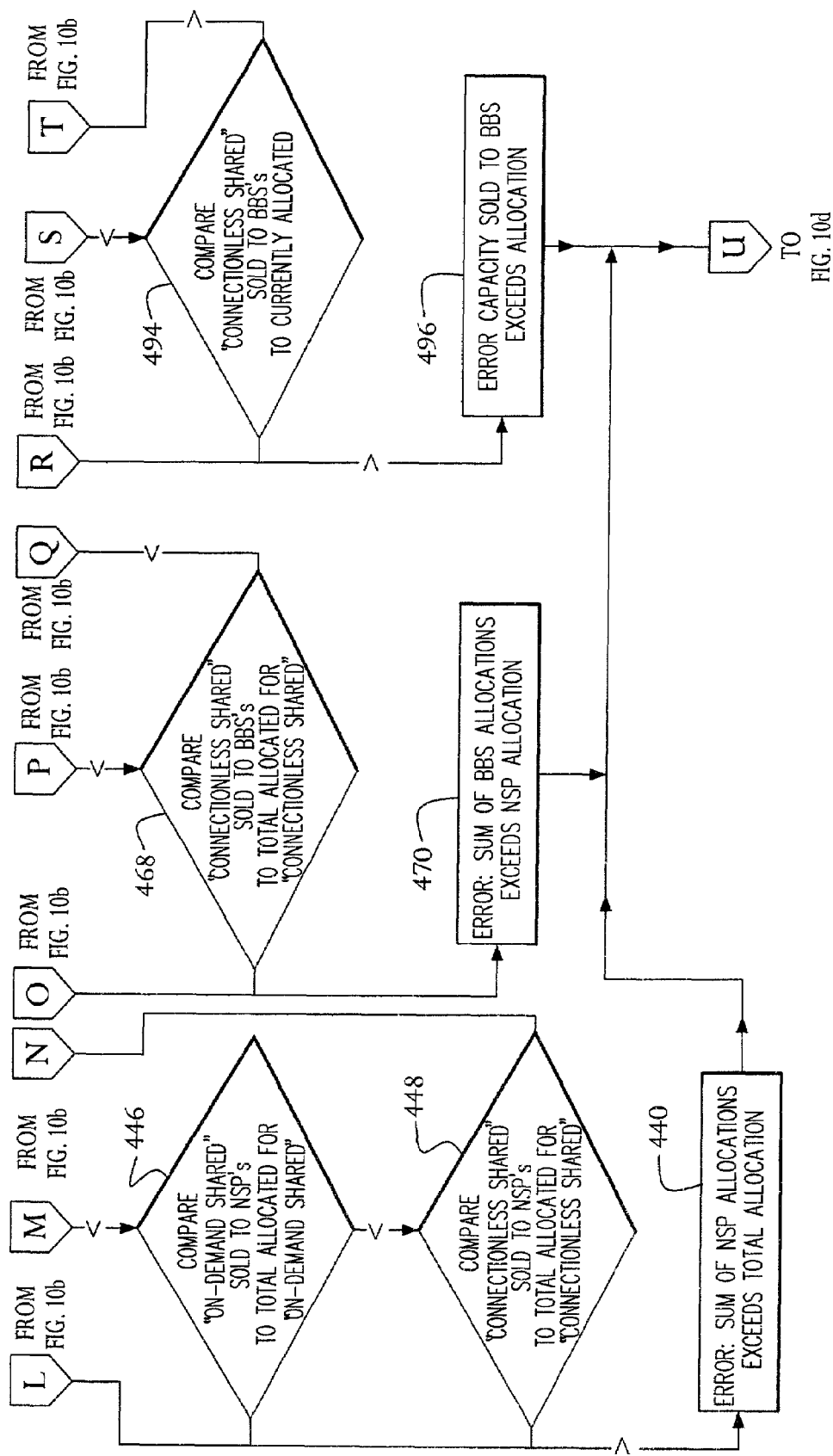
Figure 10D:
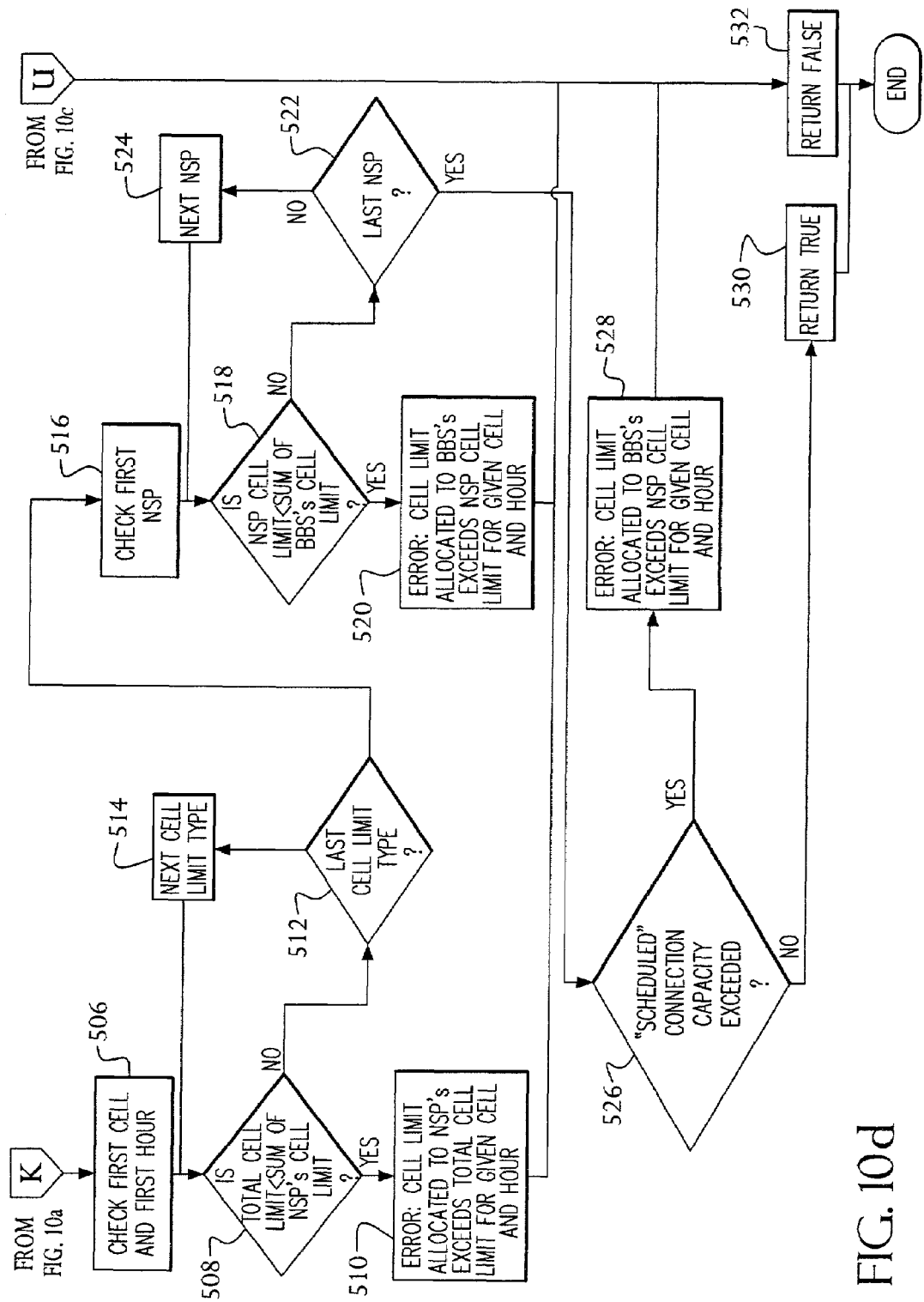

An example of a downlink allocation algorithm according to a preferred embodiment of the present invention is illustrated in the flowchart of FIG. 9. The downlink beam is time divided between a point-to-point node (PTP) and a CONUS mode (CONUS). At step 392, the processor computes the maximum PTP and CONUS capacities based on the time divided (TDM) duty cycle. Next, at step 394, the total allocation capacity for PTP is validated at step 394. In order to validate the total allocation capacity for PTP, the processor first computes the amount of total capacity available for allocation in each microcell at step 396. At step 398 the processor ensures that for each polarization a maximum of 12 downlink cells are capable of allocating the maximum PTP capacity. For each microcell in each polarization, the processor makes sure that the allocation is achievable considering the sum of allocations to microcells in the stand-off region at step 400. Once the total allocation capacity for PTP has been validated, the processor validates the NSP allocation capacity for PTP at step 402. In order to validate the NSP allocation capacity for PTP, for each microcell and for each polarization, the processor makes sure that the total allocation capacity in each traffic type and service category is not less than the sum of the respective allocations to NSPs at step 404. For each microcell in each polarization, and for each NSP, the processor makes sure that the NSP allocation in each traffic type and service category is not less than the sum of the respective allocations to that NSPs set of BBS customers at step 406.

Next, the processor validates the total allocation capacity for CONUS at step 408. For each CONUS beam, the processor computes the amount of total capacity available for CONUS at step 410. For each CONUS beam, the processor makes sure that the total capacity allocation does not exceed the maximum CONUS capacity at step 412. For each CONUS beam in each polarization, the processor tests whether the total allocation capacity in each traffic type and service category is less than the sum of the respective allocations to the NSPs at step 414. Finally, for each CONUS beam in each polarization, and for each NSP, the processor makes sure that the NSP allocation in each traffic type and service category is not less than the sum of the respective allocation to that NSPs set of BBS customers at step 416.

Finally, the processor validates multicast replication throughout the allocations at step 418. First, the processor computes the amount of replication throughout the capacity allocated at step 420. The processor makes sure at step 420 the processor makes sure that the amount of replication does not exceed the maximum replication. Next, the processor calculates the total replication throughout the capacity allocation in each traffic type and service category and makes sure that it is not less than the sum of the respective allocations to the NSPs at step 424. Finally, the processor makes sure that the NSP allocation in each traffic type and service category is not less than the sum of the respective allocations to that NSPs set of BBS customers at step 426.

An exemplary uplink allocation algorithm is illustrated in the flowchart of FIGS. 10*a*, 10*b*, 10*c* and 10*d*. In an example of a satellite communication system in accordance with an embodiment of the present invention, different uplink service rates and service types are offered to BBS customers. For instance, according to an embodiment of the present invention, uplink service rates can be offered at 128 Kbps, 512 Kbps, 2 Mbps and 16 Mbps. Also, for each service rate, different service types are available, for instance, according to the preferred embodiment of the present invention uplink service can be scheduled dedicated, on-demand dedicated, scheduled shared, on-demand shared, or connectionless shared. As will be described in greater detail below, different service rates and service types can be combined to accommodate different needs within a single subband. Therefore, the capacity management processor allocates portions of each subband to different service rates and services types. When new service or a change in service is requested, the capacity management processor should ensure that there is enough capacity allocated for the particular service rate and service type to accommodate the request.

The flowchart of FIGS. 10*a*, 10*b*, 10*c* and 10*d* illustrates an example of a preferred uplink allocation algorithm performed by the capacity management processor. First, at step 428, the capacity management processor checks the first cell at the first hour of the capacity management plan. The capacity management processor iterates through the uplink allocation algorithm of FIGS. 10*a*, 10*b*, 10*c* and 10*d* for each cell and for each hour of the capacity management plan. At step 430, the processor checks whether there have been any changes to the total capacity for allocations to customers.

Starting with the first service rate in step 432, the processor checks each service rate and each service type to determine whether enough resources are allocated in each rate and type. The processor first checks whether the total allocated volume of all service type is greater than the total volume configured at step 434. If the total volume allocated through all service types is too large, an error message is generated at step 436. If the total volume is not too large, then each of the service types are individually checked in turn. At step 438 the volume "scheduled dedicated" service sold to NSPs is compared to the total volume allocated for "scheduled dedicated". If the volume of scheduled dedicated sold to NSPs is too large, an error message is generated at step 440. If the volume of scheduled dedicated is not too large, then the processor checks the volume of "on-demand dedicated" at step 442. If the volume of "on-demand dedicated" sold to NSPs is larger than the total allocated for on-demand dedicated then an error message is generated at step 440. Otherwise the processor checks the volume of "scheduled shared" service sold to NSPs at step 444. The processor similarly checks the volume of "on-demand shared" service at step 446, and the volume of "connectionless shared" service sold to NSPs at step 448.

If no errors are detected for the first service rate, then the processor determines whether there are more service rates to check at step 450. If there are more service rates to check, then the processor moves on to the next rate at step 452 and repeats the tests of steps 434 through 448 for the next service rate. Once the last service rate has been checked at step 450 or if there are no changes to the total capacity allocated for customers at step 430, the processor moves to step 454 to check whether there have been any changes to NSP level service allocation.

The processor checks service allocated to the first NSP at step 456 and for the first NSP the processor checks the first service rate at step 458. At steps 460 through 468, the processor compares the volume of each service type sold to individual BBSs to the total allocated for each of the service types. If the total volume sold to BBSs for any service type exceeds the total allocated, then an error message is generated at step 470. If no error messages are generated for any of the service types at steps 460 to 468, then the processor checks whether there are any more service rates to check. If there are more service rates, then the processor moves to the next service rate at step 474 and repeats steps 460 through 468 for each service rate.

Once every service rate for the first NSP has been checked at step 472, the processor checks whether there are more NSPs to check at step 476. If there are more NSPs, then the processor moves on to the next NSP at step 478 and beginning with the first service rate at step 458 the processor checks each service type and each service rate for each additional NSP. Once all the NSPs have been checked at step 476, the processor moves to step 480.

At step 480 the processor checks whether there are any changes to BBS level allocations. If there have been any changes to BBS level allocations, then the processor checks the first BBS at step 482 and beginning with the first service rate at step 484 the processor checks each of the service types sold to BBSs and compares them to the amount currently allocated for the particular service type at steps 486 to 494. If any of the service types sold to the BBS exceed the total allocated for the particular service type, an error message is generated at step 496. The processor checks each of the rates at steps 498 to 500 and repeats the checks for each BBS at steps 502 to 504.

Once every BBS has been checked, the processor moves to step 506 shown in FIG. 10*b*, which is to check the first cell limit type. At step 508 the processor determines whether the total cell limit is less than the sum of the cell limit for NSPs. If the limit is exceeded, an error message is generated at step 510. The processor repeats the test for cell limit type for each cell limit type at steps 512 to 514.

Once each cell limit type has been tested for the total service allocation, the processor checks the cell limit for each NSP individually beginning with the first NSP at step 516. If the NSP cell limit is less than the sum of an individual BBSs cell limit at step 518, an error message is generated at step 520. Step 518 is repeated for each NSP at steps 522 to 524. Once the cell limits have been checked for every NSP, the processor checks whether any allocation volume is less than the allocation volume already assigned to a scheduled connection at step 526.

If there are any allocation volumes which are less than an allocation already assigned to a scheduled connection, an error messages is generated at step 528. If the allocation volumes are all greater than the volume assigned to schedule connections, then all of the checks have tested successfully and the processor can return a positive volume for the particular cell and our being tested at step 530. If, on the other hand, any error messages were generated, the processor moves to step 532 indicating that an error occurred. If an error did occur, then the allocation of satellite resources for uplink will need to be modified, or certain requests for satellite resources will need to be denied. Reconfiguration in order to satisfy the maximum number of allocation requests may be performed by an algorithm which can be developed, or as will be understood by those of skill in the art, reconfiguration can be manually performed by a network engineer.

Figure 11A:
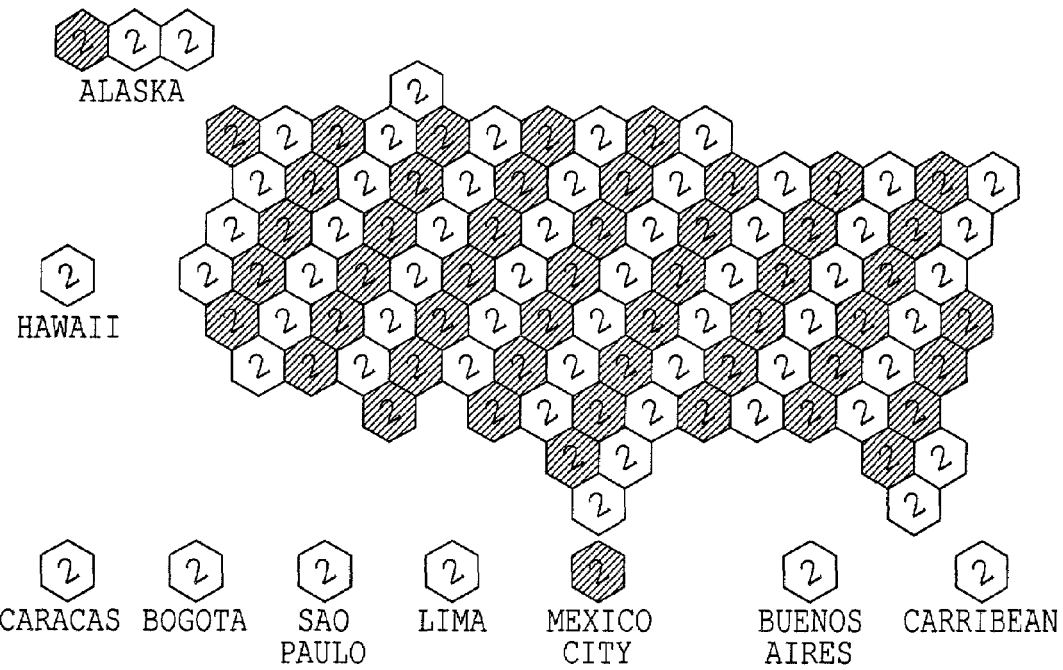
FIGS. 11a and 11b illustrates examples of subband allocations to different geographic cells, according to an embodiment of the present invention.
Figure 11B:
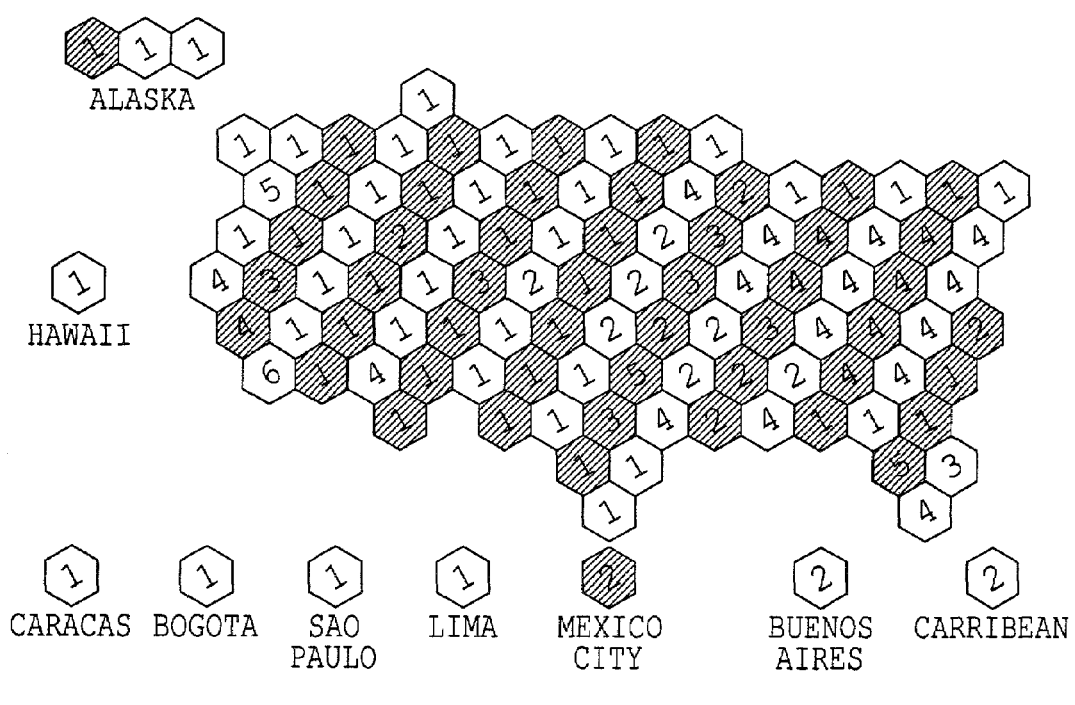

FIGS. 11*a* and 11*b* illustrate two possible distributions of subbands among geographic cells. FIG. 11*a* illustrates a uniform distribution of subbands. As shown, each cell is allocated two subbands. FIG. 11*b* illustrates a population-based distribution of subbands. As shown, each cell has different number of subbands allocated to it based on the volume of satellite resources needed in that particular geographic cell. Note that a minimum of one subband is allocated in each and every cell.

Figure 12A:
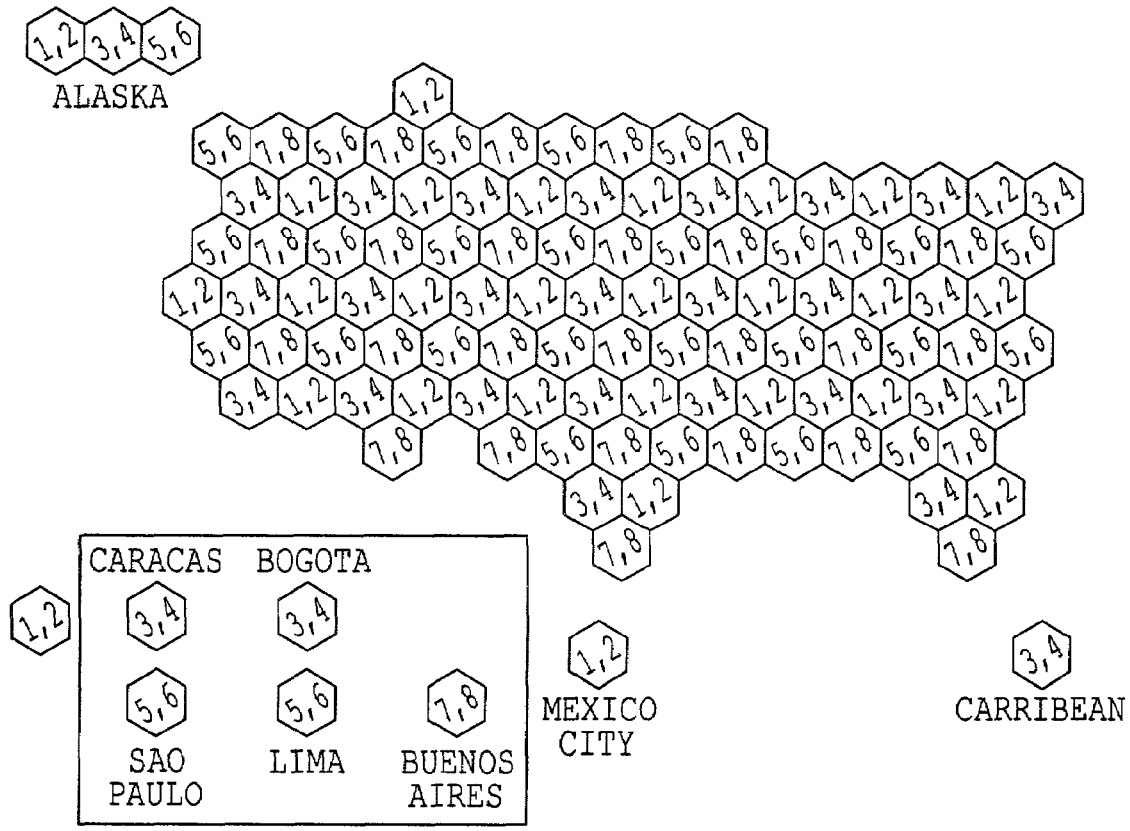
FIG. 12a illustrates an example of a uniform distribution of subbands among geographic cells according to an embodiment of the present invention.
Figure 12B:
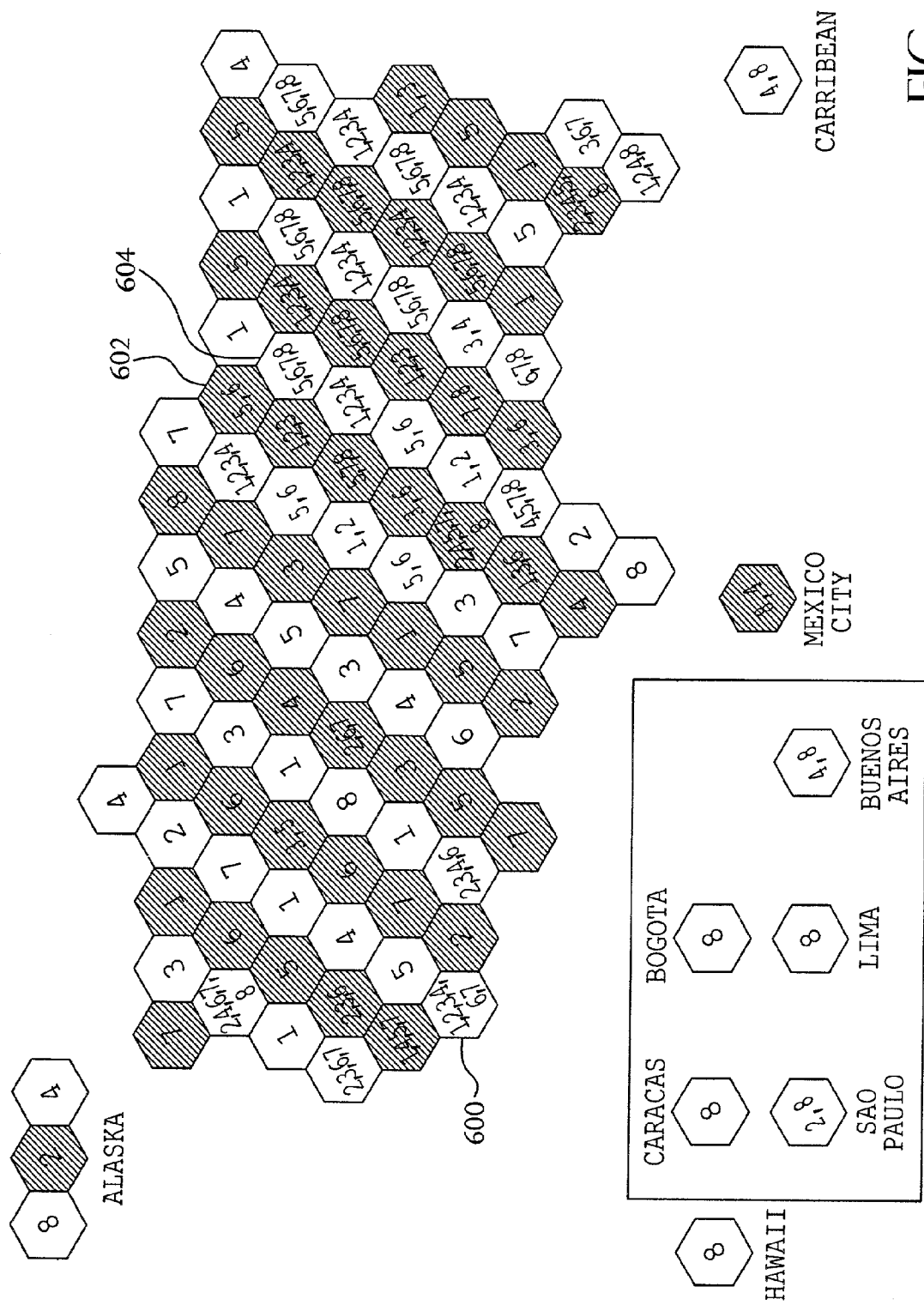
FIG. 12b illustrates an example of a demand based distribution of subbands amongst geographic cells, according to an embodiment of the present invention.

FIGS. 12*a* and 12*b* show examples of actual subband numbers which are allocated to particular cells. In FIG. 12*a*, the subbands are distributed uniformly as in FIG. 11*a*. Note that in FIG. 12*a* no two neighboring cells contain the same subband numbers. In FIG. 12*b*, subband allocation is shown based on population density. Note that every cell has at least one subband allocated to it, while some cells, such as the cell noted at 600 have as many as six subbands allocated. Using population distribution, it is impossible to prevent reusing the same subband in direct neighboring cells. For instance, subbands 5 and 6 are repeated in cells 602 and 604. However, this can be tolerated because cells 602 and 604 are of different polarizations as indicated by the shading of the cells. As will be described in FIG. 13, one of the system constraints is that subbands may not be repeated in a cell's nearest neighbors of the same polarization. Thus, because subbands 5, 6, 7, and 8 are used in cells 604, these four subbands are not repeated in the nearest four white cells which share the same polarization.

Figure 13:
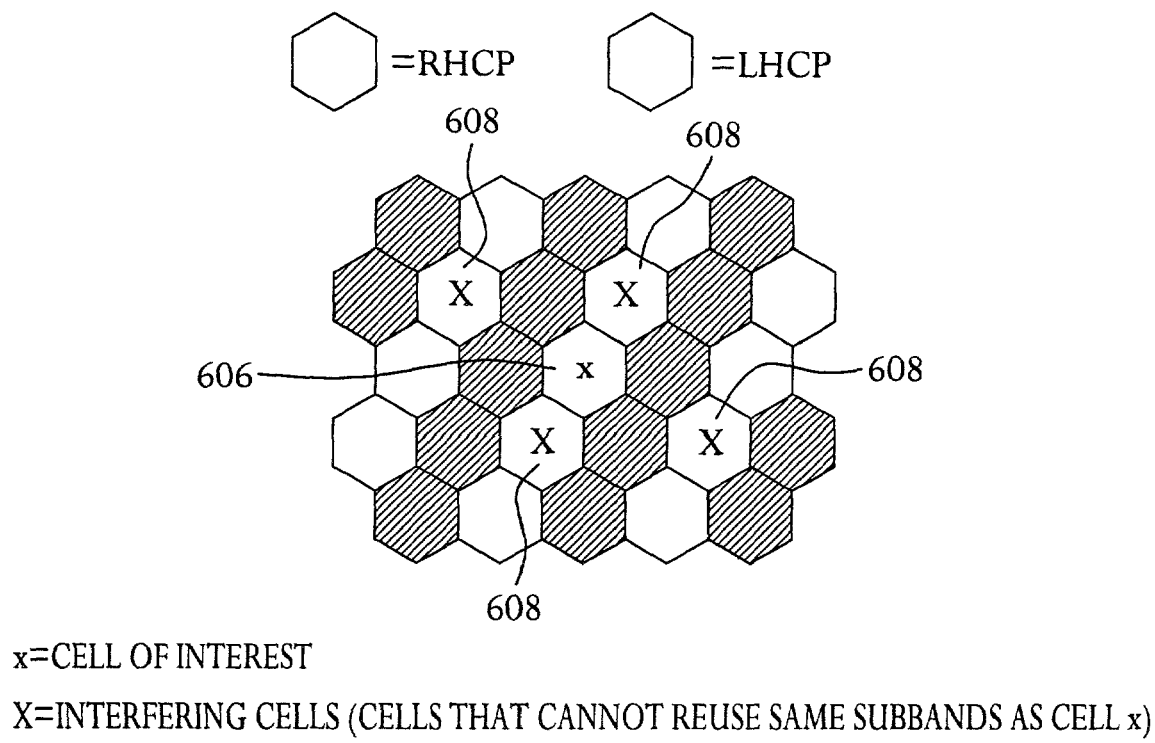
FIG. 13 illustrates an example of interference considerations between a cell of interest and neighboring co-polarization cells, which can be taken into consideration according an embodiment of the present invention.

FIG. 13 shows a detail of a group of cells. Cell 606 is the subject cell. The cells marked 608 are considered interfering cells because they are the subject cell's 606 nearest neighbors in the same polarization. Therefore, subbands used in cells 606 cannot be used in cells 608.

Figure 14:
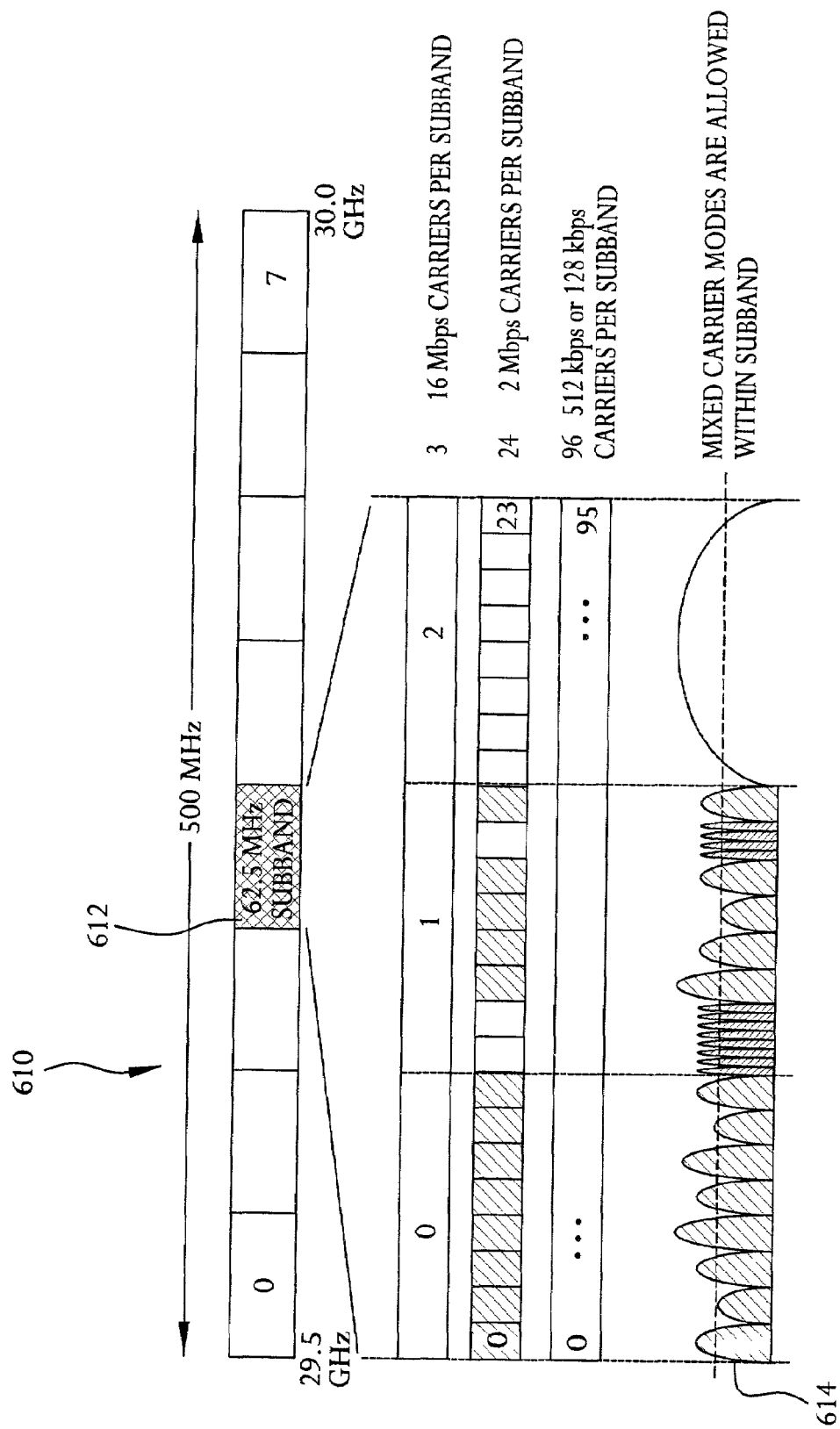
FIG. 14 illustrates an example of a frequency allocation plan for a particular subband within a particular geographic cell, according to an embodiment of the present invention.

According to the preferred embodiment there are eight subbands. FIG. 14 illustrates the allocation of resources within a single subband. The entire frequency in use by the satellite is shown generally at 610. As shown in FIGS. 11*a* through 12*b* a particular cell can be allocated one or more subbands. A subband is shown at 612. A subband is further broken down into smaller frequency ranges referred to as carriers, or service rates. A higher service rate requires a greater frequency range, therefore the highest service rate according to the preferred embodiment of the present invention is 16 Mbps. Three 16 Mbps carriers would fill an entire subband. Likewise twenty-four 2 Mbps carrier would fill a subband. Similarly, 96 512 Kbps carriers or 128 Kbps carrier would fill a subband. It is possible, however, to mix carrier types as shown at 614 within a subband to accommodate varying requests by customers. The capacity management processor will take additional constraints into consideration to maximize the efficiency of the various carrier rates within each subband. Also, as will be understood by those of skill in the art, there are many other constraints which may be advantageous to take into consideration. For instance, it may be desirable to prevent placing a 16 Mbps carrier next to a 512 Kbps or 128 Kbps carrier. Similarly, it may be advantageous to include stand-off regions between carriers within the subband to reduce inter-carrier interference. These and many other system constraints may be taken into consideration by the capacity management processor, and the number of constraints is limited only by the imagination of the engineers and the processing power available to the capacity management processor.

Figure 15:
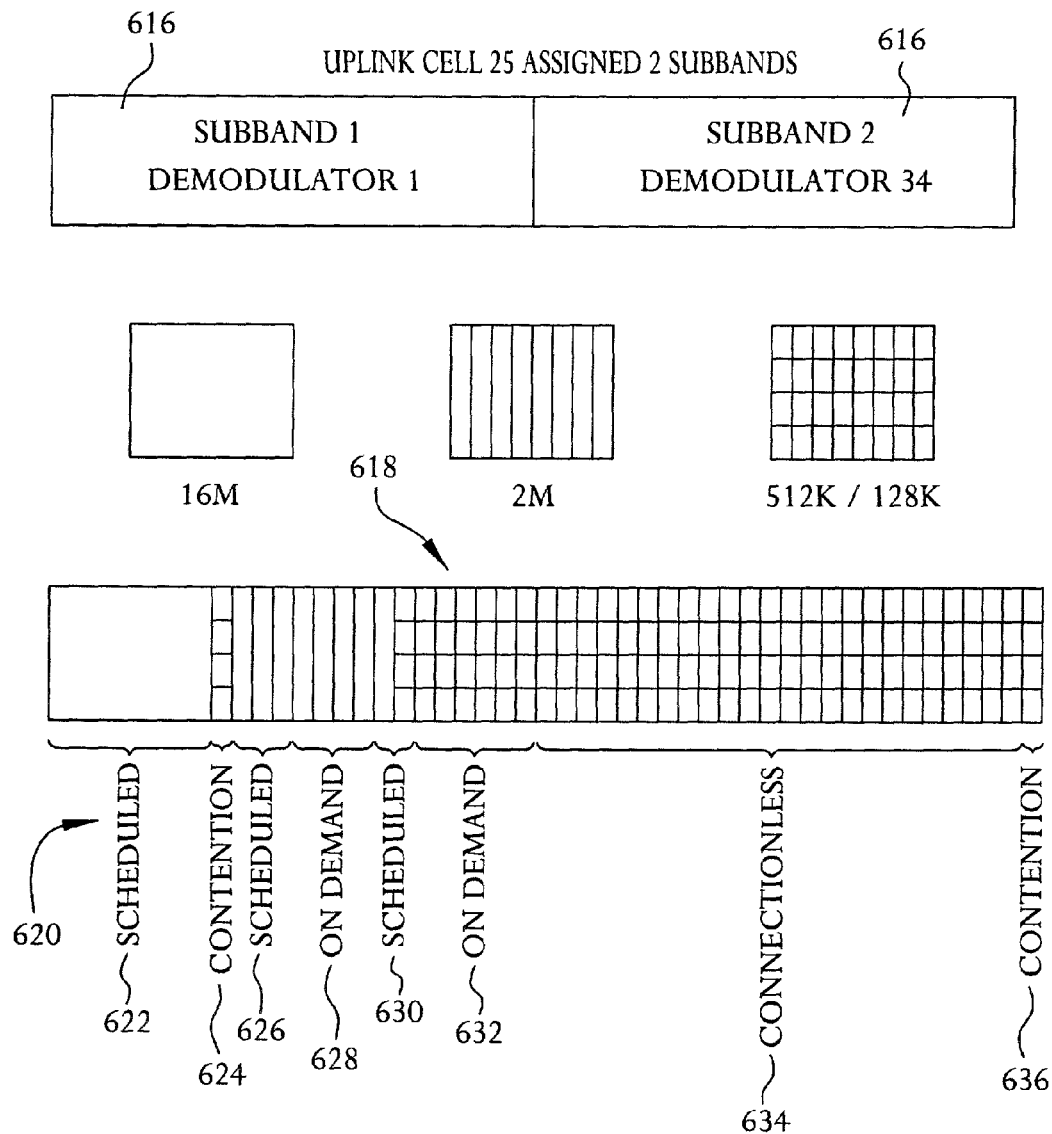
FIG. 15 illustrates an example of planning system capacity resource allocation by service class among two subbands within a particular geographic cell, according to an embodiment of the present invention.

FIG. 15 illustrates how different service types in addition to varying service rates may be allocated within subbands. For this illustration a particular cell has been assigned two subbands 616. As illustrated, different service rates are allocated along the two subbands 618. Also, each service rate within a subband can be any one of the service types shown generally at 620. Thus, as shown in FIG. 15, by way of example, there is a 16 Mbps scheduled connection 622, a 128 Mbps contention channel 624, a 2 Mbps scheduled connection 626, a 2 Mbps on-demand connection 628, a 512 Kbps scheduled connection 630, a 512 Kbps on-demand connection 632, a 512 Kbps connectionless service 624, and finally, another 128 Kbps contention channel 636.

Although only a few exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included in the scope of this invention as defined in the following claims.

What is claimed is:

1. A system for providing automated distributed provisioning satellite resources in a satellite communication network comprising:
   at least one satellite, said satellite comprising a plurality of antenna elements for receiving transmissions from geographically distinct cells, a plurality of demodulators each adapted to demodulate signals in a particular frequency band, a switch matrix for connecting said antenna elements to said demodulators, and a payload processor for configuring said switch matrix to configure said satellite resources as a payload configuration, wherein said resources comprise a plurality of channels for transmitting information to or from said satellite;
   a satellite resource allocation plan, comprising information about the payload configuration over time and an allocation of satellite capacity pools amongst a plurality of remote network operators at geographically distributed locations;
   a capacity management unit having a plurality of network interfaces displayed to and accessible by the remote network operators, wherein the capacity management unit is adapted to automatically (i) receive via the network interfaces a capacity allocation plan from any one of the remote network operators requesting a capacity allocation within one or more capacity pools allocated to said one network operator, (ii) to determine whether said capacity allocation plan can be fulfilled based on a plurality of system constraints including the satellite resource allocation plan, (iii) to update the satellite resource allocation plan based on results of the determination, and to send commands to said payload processor in order to modify the payload configuration to satisfy the capacity allocation plan.

2. A system for provisioning satellite resources as in claim 1, wherein said plurality of network interfaces are accessed over a local area network.

3. A system for provisioning satellite resources as in claim 1, wherein said plurality of network interfaces are accessed over a wide area network.

4. A system for provisioning satellite resources as in claim 1, wherein said plurality of system constraints further includes the number of antenna elements on board said satellite.

5. A system for provisioning satellite resources as in claim 1, wherein said plurality of system constraints further includes the number of demodulators on board said satellite.

6. A system for provisioning satellite resources as in claim 1, wherein said plurality of system constraints further includes the switch matrix.

7. A system for provisioning satellite resources as in claim 1, further comprising a primary network interface adapted to allow a network engineer to access the capacity management unit and further modify the satellite resource allocation plan and the payload configuration.

8. A system for provisioning satellite resources as in claim 3, wherein said wide area network includes a secure connection over the Internet.

9. A system for provisioning satellite resources as in claim 1
   wherein the satellite further comprises a payload processor, and said payload processor is adapted to configure said switch matrix over a period of time based on said resource allocation plan.

10. The system of claim 9, wherein said capacity management unit is further adapted to determine, for said capacity allocation plan,
    which geographic cells are associated with the capacity allocation plan,
    whether there is an available frequency band within each such associated cell to fulfill the capacity allocation plan,
    whether a demodulators are available to demodulate each available frequency band, and
    whether said switch matrix is capable of connecting an antenna element associated with each associated cell with each available demodulator.

11. A method of automatically allocating satellite resources in a satellite communications system having at least one satellite, said satellite having a plurality of demodulators for demodulating signals received in certain frequency bands, and further having a plurality of antenna elements for receiving signals from distinct geographic cells, and further having a switching matrix for associating antenna elements with demodulators, the method comprising the steps of:
   receiving via a plurality of network interfaces and at a capacity management unit of the satellite communications system, a capacity allocation plan from one of a plurality of remote network operators at geographically distributed locations, said capacity allocation plan being received via the network interfaces displayed to the plurality of remote network operators and used for requesting a capacity allocation within one or more capacity pools allocated to said one network operator;
   automatically determining, based on a plurality of system constraints, whether said capacity allocation plan can be satisfied;

automatically modifying a satellite resource allocation plan based on results of the determining step; and automatically transmitting commands to said satellite to reconfigure a payload configuration of the satellite in order to be capable of fulfilling the modified satellite resource allocation plan.

12. The method of claim 11, wherein said determining step further comprises the steps of:

for said capacity allocation plan, determining which of said geographic cells are associated with the capacity allocation plan;

determining whether there is an available frequency band within each such associated cell to fulfill the capacity allocation plan;

determining whether demodulators are available to demodulate each available frequency band; and determining whether said switch matrix is capable of connecting an antenna element associated with each associated cell with each available demodulator.

13. The method of claim 11, wherein the plurality of system constraints comprises a satellite resource allocation plan including information regarding a payload configuration and an allocation of satellite capacity pools amongst the plurality of remote network operators.

14. The method of claim 11, wherein said plurality of system constraints comprises the number of antenna elements on the satellite.

15. The method of claim 11, wherein wherein the plurality of system constraints comprises the number of demodulators on the satellite.

16. The method of claim 11, wherein plurality of system constraints comprises the switch matrix.

17. The method of claim 11, wherein the satellite resource allocation plan comprises information related to the payload configuration over time and an allocation of satellite capacity pools amongst the plurality of remote network operators at geographically distributed locations.

18. The method of claim 11, wherein the payload configuration comprises a configuration of connections, through the switching matrix, between the plurality of antenna elements and the plurality of demodulators.

19. The method of claim 11, further comprising the step of accessing the capacity management unit through a primary network interface and further modifying the satellite resource allocation plan and the payload configuration.

20. The system of claim 1, wherein network interface provides an area for displaying and selecting features related to the requested capacity allocation.

21. The system of claim 20, wherein the features include at least one of a data rate, a time scale, a start time and an end time, a mapping of cells in a coverage area, and a capacity allocation of a particular cell.

22. The method of claim 11, further comprising selecting and displaying via the network interface features related to the requested capacity allocation.

23. The method of claim 22, wherein the features include at least one of a data rate, a time scale, a start time and an end time, a mapping of cells in a coverage area, and a capacity allocation of a particular cell.

* * * * *